United States Patent
Shoji et al.

(10) Patent No.: US 9,048,739 B2
(45) Date of Patent: Jun. 2, 2015

(54) POWER SUPPLY DEVICE AND IMAGE FORMING APPARATUS

(71) Applicant: CANON KABUSHIKI KAISHA, Tokyo (JP)

(72) Inventors: Ryuhei Shoji, Mishima (JP); Masaru Aoki, Numazu (JP); Minoru Hayasaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/781,657

(22) Filed: Feb. 28, 2013

(65) Prior Publication Data
US 2013/0236206 A1      Sep. 12, 2013

(30) Foreign Application Priority Data
Mar. 9, 2012  (JP) ................................ 2012-053524

(51) Int. Cl.
*G03G 15/00*   (2006.01)
*H02M 3/335*  (2006.01)

(52) U.S. Cl.
CPC ...... *H02M 3/33507* (2013.01); *H02M 3/33523* (2013.01); *G03G 15/80* (2013.01); *Y02B 70/1433* (2013.01)
USPC ......................................................... 399/88

(58) Field of Classification Search
CPC ......... G03G 15/80; H02M 3/03; H02M 7/217
USPC ......................................................... 399/88
See application file for complete search history.

(56) References Cited

U.S. PATENT DOCUMENTS 5,953,223 A * 9/1999 Kato et al. ..................... 363/69
8,242,873 B2  8/2012 Hayasaki et al.
(Continued)

FOREIGN PATENT DOCUMENTS

CN    1705217 A     12/2005
JP    2002-153055 A  5/2002
(Continued)

OTHER PUBLICATIONS

Chinese Office Action dated Nov. 19, 2014 in corresponding Chinese Application No. 201310073421.2 (with whole English translation).
Korean Office Action dated Mar. 11, 2015 in corresponding Korean Application No. 10089121KR01.

*Primary Examiner* — Walter L Lindsay, Jr.
*Assistant Examiner* — Frederick Wenderoth
(74) *Attorney, Agent, or Firm* — Fitzpatrick, Cella, Harper & Scinto

(57) ABSTRACT

The power supply device includes a transformer, a switching unit for driving a primary side of the transformer, a detection unit for detecting an output corresponding to a current flowing on the primary side, a transmission unit for transmitting an output voltage from a secondary side to the primary side, and a control unit for controlling an operation of the switching unit in accordance with an output from the transmission unit, in which, when a switching frequency for driving the switching unit falls within a predetermined frequency range including a resonant frequency of the transformer, the control unit controls the switching unit so as to shorten a turn-ON time of the switching unit in accordance with an output from the detection unit.

16 Claims, 16 Drawing Sheets

(56) References Cited

U.S. PATENT DOCUMENTS

2003/0214820 A1* 11/2003 Nakata .................. 363/21.01
2010/0135049 A1* 6/2010 Radecker et al. ......... 363/21.03
2010/0149840 A1 6/2010 Hayasaki et al.

FOREIGN PATENT DOCUMENTS

| JP | 3665984 B2 | 6/2005 |
| JP | 2007-135277 A | 5/2007 |
| KR | 2011-0139136 A | 12/2011 |

* cited by examiner

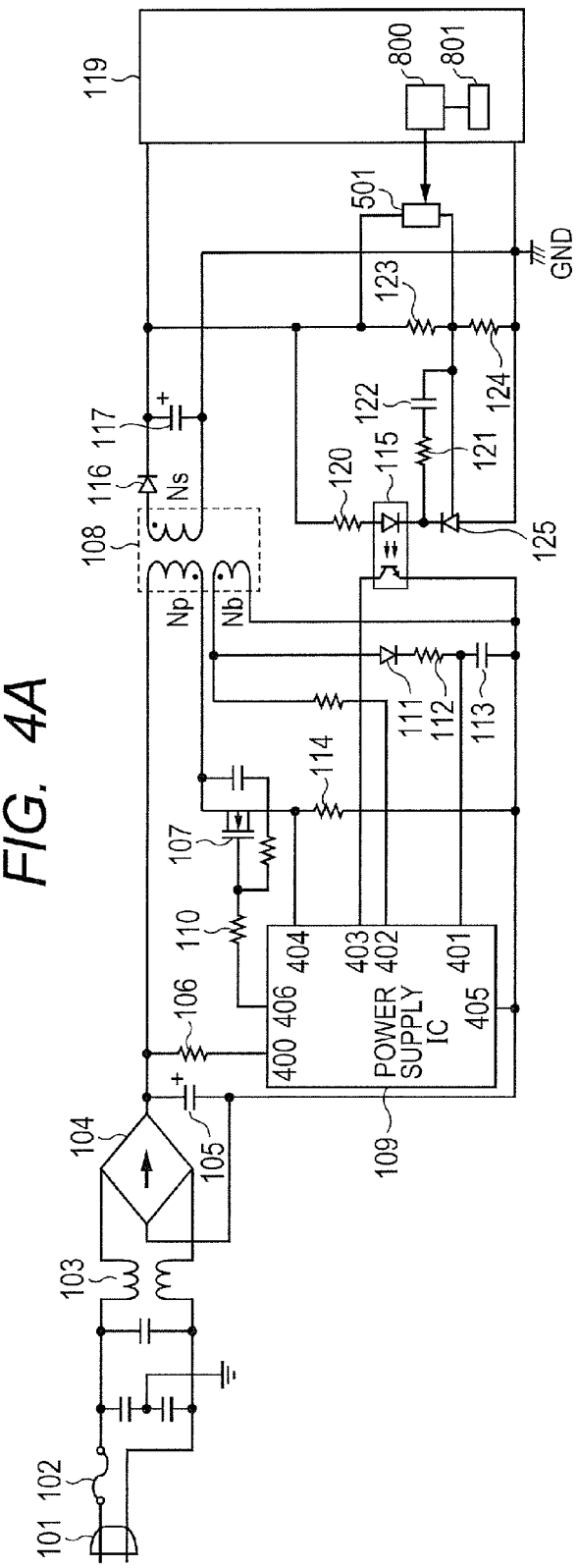
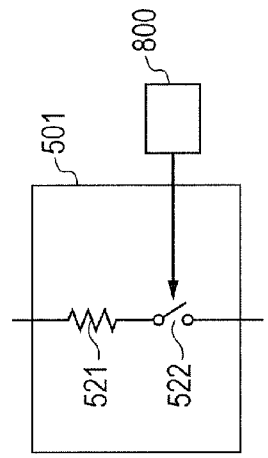
FIG. 4A
FIG. 4B

POWER SUPPLY DEVICE AND IMAGE FORMING APPARATUS

BACKGROUND OF THE INVENTION

1. Field of the Invention

The present invention relates to a self-excited flyback switching power supply device for converting a high direct current voltage obtained by rectifying and smoothing a commercial power supply into a low direct current voltage necessary for a device, and to an image forming apparatus including the power supply device.

2. Description of the Related Art

In recent years, power saving is required in various electronic devices. Following the demands, further power saving is required also for a power supply of the electronic devices. As an example of the power supply of the electronic devices, there is used a switching-mode power supply (hereinafter referred to as "switching power supply") for outputting a target voltage by driving a switching element such as a field effect transistor (FET) at a predetermined frequency. In some types of the switching power supply, the number of switching operations of the switching element is reduced in a power-saving operation (hereinafter referred to also as "light load operation") to improve efficiency. The specifications for power saving have been subject to annual changes, and it has been required to improve efficiency by saving power in a normal operation as well as the light load operation.

Most of the losses of the switching power supply in the light load operation are caused by the switching operation. Therefore, the reduced number of the switching operations in the light load operation contributes greatly to a higher efficiency of the switching power supply. Thus, the following measure is often taken. In order to reduce the loss caused by the switching operation in the light load operation, the turn-ON time of the switching element is lengthened. This increases energy of each switching operation, thereby lengthening an inactive period of the switching operation to reduce the number of switchings per unit time.

The long inactive period of the switching operation, however, leads to a low switching frequency. As a result, operating sound of a transformer in the switching operation becomes audible to human ears. This is because mechanical vibration noise of the transformer driven in synchronization with the switching operation is shifted to the human audible frequency band (about 20 Hz to 20 kHz) due to the decrease in switching frequency.

One well-known method for reducing the vibration noise from the transformer is to suppress a magnetic field variation of the transformer to reduce the noise. For example, a method of using a core material having a large cross-sectional area for the transformer or a method of shortening the turn-ON time of the switching element to reduce a current of the transformer per switching has been employed in order to suppress the magnetic field variation of the transformer.

A known method for appropriately producing a driving current waveform of the transformer to alleviate the vibration noise of the transformer is to provide a soft-start circuit in the switching power supply device and to gradually change the duty cycle at the rising and falling edges of a voltage across a capacitor at the start of activation. By setting the driving current waveform of the transformer to be gradually larger or gradually smaller, the magnetic flux of the transformer does not change easily, and hence the generation of vibration noise can be reduced. Such a conventional method is described in, for example, Japanese Patent No. 3665984.

However, the above-mentioned methods of reducing the vibration noise of the transformer have the following problems. According to the method of using a core material having a large cross-sectional area for the transformer, the transformer is increased in size, and hence it is difficult to downsize the power supply device. According to the method of uniformly shortening the turn-ON time of the switching element, the turn-ON time is reduced to reduce the change in magnetic field of the transformer, and hence the vibration noise of the transformer is alleviated. However, the number of switchings per unit time increases, and the switching loss increases, resulting in control unfavorable to power saving. Further, the method of changing the driving current waveform of the transformer to be gradually larger or gradually smaller is difficult to be applied to the case of the light load operation where energy to be supplied to a load on the secondary side of the transformer is small. In other words, this method is difficult to be applied because the inactive period of the switching operation is provided in the light load operation and it is therefore difficult for the soft-start circuit to change the current waveform to be gradually larger or gradually smaller.

In the case of driving the transformer in the light load operation, the resonant frequency of the transformer needs to be taken into consideration. The sound pressure level of the vibration noise of the transformer generated in the light load operation varies depending on the driving frequency of the switching element. In particular, when the driving frequency of the switching element matches with the resonant frequency of the transformer, the sound pressure level becomes very high. The mechanical resonant frequency of the transformer used in a switching power supply depends on the shape of the core of the transformer, but has a peak of the resonant frequency (f0) at about several kHz to ten and several kHz. This frequency band is the audible band to humans, and is also a driving frequency band of the switching element that can operate in the light load operation. Therefore, if the switching element is driven at the resonant frequency of the transformer, a conspicuously recognizable harsh noise is generated from the transformer. In the above-mentioned conventional methods, the control of reducing the vibration noise is not performed in accordance with the characteristics of the transformer, and hence there has been a problem in that the vibration noise cannot be suppressed effectively in the switching operation in the light load operation.

SUMMARY OF THE INVENTION

A purpose of the present invention is to reduce vibration noise generated from a transformer in a light load operation and reduce power consumption.

Another purpose of the present invention is to provide a power supply device including a transformer in which a primary side and a secondary side are insulated with each other, a switching unit for driving the primary side of the transformer, a detection unit for detecting a current flowing on the primary side to output an output value corresponding to the current, a transmission unit for transmitting an output voltage from the secondary side to the primary side, and a control unit for controlling an operation of the switching unit in accordance with an output from the transmission unit, wherein when a switching frequency for driving the switching unit falls within a predetermined frequency range including a resonant frequency of the transformer, the control unit controls the switching unit.

A further purpose of the present invention is to provide an image forming apparatus including image forming means for forming an image on a recording material, driving means for driving the image forming means, and a power supply for supplying electric power to the driving means, wherein the power supply includes a transformer in which a primary side and a secondary side are insulated with each other, switching means for driving the primary side of the transformer, detection means for detecting a current flowing on the primary side to output an output value corresponding to the current, transmission means for transmitting an output voltage from the secondary side to the primary side, and control means for controlling an operation of the switching means in accordance with an output from the transmission means.

A further purpose of the present invention is to provide an image forming apparatus including an image forming unit for forming an image on a recording material, a controller for controlling an operation of the image forming unit, and a power supply for supplying electric power to the controller, wherein the power supply includes a transformer in which a primary side and a secondary side are insulated with each other, a switching unit for driving the primary side of the transformer, a detection unit for detecting a current flowing on the primary side to output an output value corresponding to the current, a transmission unit for transmitting an output voltage from the secondary side to the primary side, and a control unit for controlling an operation of the switching unit in accordance with an output from the transmission unit.

A still further feature of the present invention will become apparent from the following description of exemplary embodiments with reference to the attached drawings.

BRIEF DESCRIPTION OF THE DRAWINGS

FIG. 4A illustrates a circuit configuration of a DC power supply device according to a second embodiment of the present invention.

FIG. 4B illustrates a circuit configuration of a regulation resistance correction circuit.

DESCRIPTION OF THE EMBODIMENTS

Figure 1:
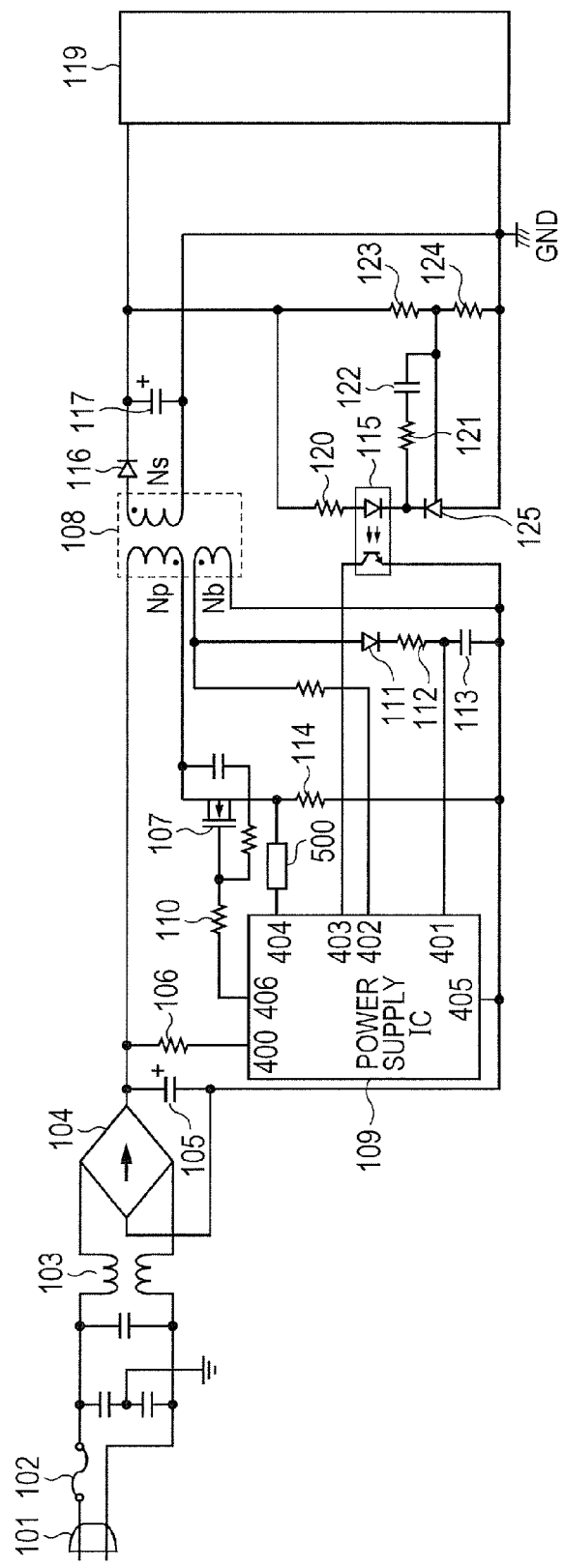
FIG. 1 illustrates a circuit configuration of a DC power supply device according to a first embodiment of the present invention.

A specific configuration of the present invention for solving the above-mentioned problems is described by way of the following embodiments. The embodiments are merely an example, and the technical scope of the present invention is not intended to be limited to the embodiments.

[Outline of DC Power Supply Device]

First, the circuit configuration and operation of a conventional direct current power supply device (hereinafter referred to as "DC power supply device") are described with reference to FIG. 10A for comparison with a power supply device of the present invention. The DC power supply device described below is a flyback switching power supply.

An AC voltage input from an inlet 101 is subjected to full-wave rectification via a fuse 102, a common mode coil 103, and a rectifying diode bridge 104, and is charged in a primary smoothing electrolytic capacitor 105 as a direct current voltage (hereinafter referred to as "DC voltage"). Then, the DC voltage is supplied to a power supply IC 109 via a start-up resistor 106 for starting the power supply IC 109, to thereby start the power supply IC 109. The power supply IC 109 is a power supply IC for controlling an intermittent operation of a field effect transistor 107 (hereinafter referred to as "FET 107") that performs a switching operation. When the power supply IC 109 is started, a predetermined voltage is applied from the power supply IC 109 to a gate terminal of the FET 107 via a current limiting resistor 110, and the FET 107 becomes the ON state (conductive state). When the FET 107 becomes the ON state, the DC voltage of the primary smoothing electrolytic capacitor 105 is applied to a primary winding Np of a flyback transformer 108 (hereinafter referred to as "transformer 108"), and a voltage whose polarity is positive on the same polarity side as the primary winding Np is induced in an auxiliary winding Nb. In this case, a voltage is induced also in a secondary winding Ns of the transformer 108 having a primary side and a secondary side insulated from each other. This induced voltage is, however, negative (−) on the anode side of a diode 116, and hence the voltage is not transmitted to the secondary side of the transformer 108. Therefore, only an excitation current of the transformer 108 flows through the primary winding Np of the transformer 108, and energy in proportion to the square of the excitation current is accumulated in the transformer 108. The excitation current increases in proportion to time. The voltage induced in the auxiliary winding Nb of the transformer 108 charges a capacitor 113 via a diode 111 for rectifying the voltage induced in the auxiliary winding Nb and a resistor 112. In this way, the power supply voltage is supplied to the power supply IC 109.

Next, when the voltage application to the gate terminal of the FET 107 from the power supply IC 109 is stopped, and the FET 107 becomes the OFF state (non-conductive state) to interrupt the current to the primary winding Np, a voltage whose polarity is opposite to that at the time of the above-mentioned start-up is induced in each winding of the transformer 108. As a result, a voltage whose polarity is positive (+) on the anode side of the diode 116 is induced in the secondary winding Ns, the energy accumulated in the transformer 108 is smoothed and rectified by the diode 116 and a secondary smoothing electrolytic capacitor 117 and is output as a DC voltage to be supplied to a load 119. Further, when the transformer 108 operates, the voltage induced in the auxiliary winding Nb of the transformer 108 is supplied as the power supply voltage of the power supply IC 109. As a result, the power supply IC 109 can continue the operation to continuously perform the switching operation of the FET 107. Thus, the transformer 108 can continue the stable operation.

The DC voltage output from the transformer 108 is controlled as follows. First, a voltage obtained by dividing the output DC voltage by regulation resistors 123 and 124 is input to a reference terminal (input terminal) of a shunt regulator 125 serving as error detection means and constituting also as a phase correction circuit formed of a resistor 121 and a capacitor 122. The shunt regulator 125 compares the input voltage of the reference terminal with a preset reference voltage, and outputs a voltage as a feedback signal from a cathode terminal in accordance with a comparison result corresponding to an error of the two voltages. The value of a current flowing through a light emitting diode (LED) in a photocoupler 115 via a current limiting resistor 120 is varied in accordance with the output voltage of the cathode terminal of the shunt regulator 125. Similarly, a current flowing through a phototransistor in the photocoupler 115 is also varied in accordance with the value of the current flowing through the LED, to thereby control a voltage input to a terminal 403 of the power supply IC 109. In this way, the power supply IC 109 performs the switching control of the FET 107 based on the feedback signal of the shunt regulator 125, and hence the control to output a stable DC voltage can be performed. Reference symbols 400 to 406 in the power supply IC 109 of FIG. 10A represent the terminal numbers of the power supply IC 109.

[Outline of Power Supply IC]

Next, the power supply IC 109 for controlling the FET 107 of the DC power supply device is described. The power supply IC 109 described below is a power supply IC 109 that operates in the current control mode with a variable frequency and a variable duty cycle, which is a typical power supply IC 109 used also in the above description. FIG. 10B illustrates an internal functional block diagram of the power supply IC 109. In FIG. 10B, reference symbols 400 to 406 represent the terminals of the power supply IC 109, which are the same as the terminal numbers of the power supply IC 109 illustrated in FIG. 10A.

First, the respective terminals of the power supply IC 109 are described. In FIG. 10B, the terminal 400 is a VH terminal for starting a start-up circuit 415, the terminal 401 is a power supply voltage (VCC) terminal for supplying the power supply voltage to the power supply IC 109, and the terminal 402 is a BOTTOM terminal for inputting the voltage induced in the auxiliary winding Nb of the transformer 108. The terminal 403 is a terminal for inputting, via the photocoupler 115, a feedback signal representing fluctuations in DC voltage output from the transformer 108. The terminal 404 is an IS (current detection) terminal for inputting a drain current Id of the FET 107 which flows through a current detection resistor 114 for detecting the current flowing through the transformer 108. The terminal 405 is a GND terminal of the power supply IC 109. The terminal 406 is an OUT terminal connected to the gate terminal of the FET 107 and to the output of a Q terminal of an internal RS flip-flop 413 (hereinafter referred to as "FF 413").

Next, the respective components illustrated in the block diagram of the power supply IC 109 of FIG. 10B are described. The start-up circuit 415 is a circuit for starting the power supply IC 109 when a primary voltage is supplied thereto. A comparator 407 has an inverting input connected to the BOTTOM terminal 402 and a non-inverting input connected to a reference voltage 408. When the input voltage of the BOTTOM terminal 402 falls below the reference voltage 408, the comparator 407 outputs a HIGH level signal to an AND circuit 411. The comparator 407 forms a circuit for detecting the end of regeneration of the secondary winding Ns. A comparator 409 has a non-inverting input connected to the FB terminal 403 and an inverting input connected to a reference voltage 410. When the input voltage of the FB terminal 403 exceeds the reference voltage 410, the comparator 409 outputs a HIGH level signal to the AND circuit 411. The comparator 409 forms a circuit for comparing the secondary-side DC voltage with a reference voltage to detect the end of an inactive period of the FET 107. The AND circuit 411 inputs the outputs of the comparators 407 and 409, and outputs a set signal to an S (set) terminal of the FF 413 when both the outputs of the comparators 407 and 409 are HIGH level. A comparator 412 has an inverting input connected to the FB terminal 403 and a non-inverting input connected to the IS terminal 404, and compares the input voltages of the FB terminal and the IS terminal. When the input voltage of the IS terminal is higher, the comparator 412 outputs a reset signal of HIGH level to an R (reset) terminal of the FF 413. Further, when the input voltage of the IS terminal 404 becomes higher than a reference voltage 414, the comparator 412 stops the oscillation operation of the power supply IC 109.

[Outline of Operation of DC Power Supply Device]

Figure 10A:
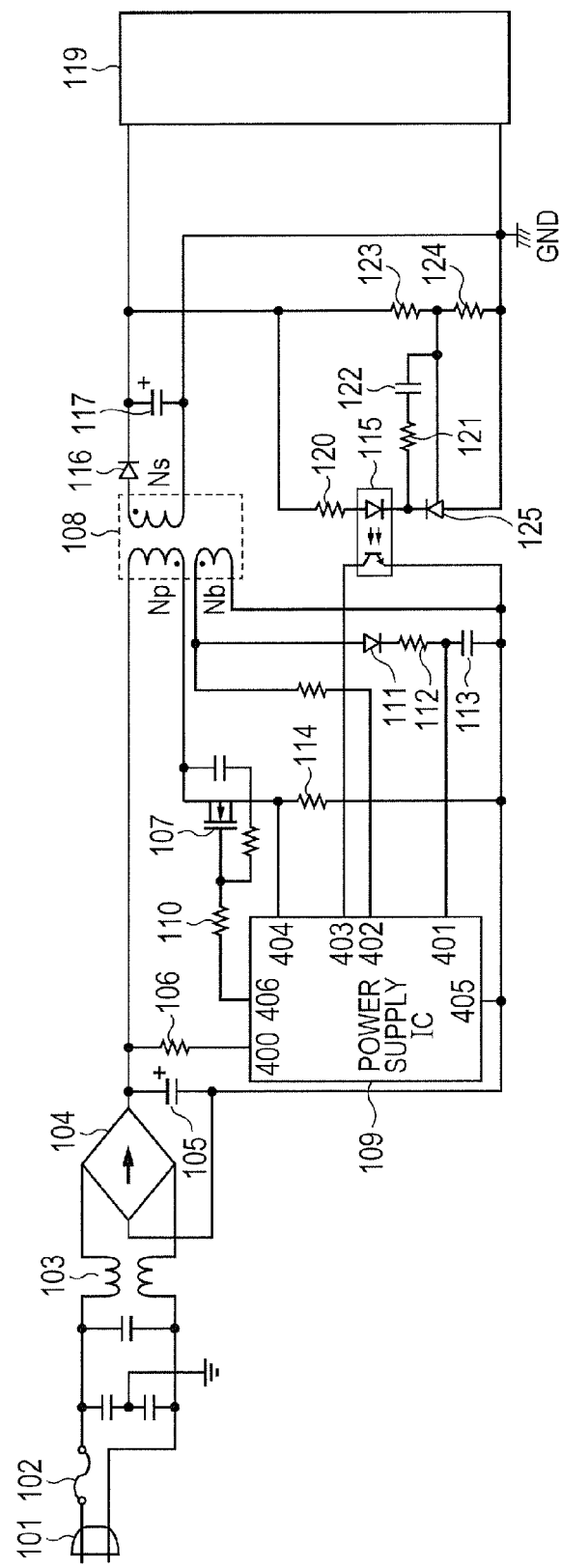
FIG. 10A illustrates a circuit configuration of a conventional DC power supply device.
Figure 10B:
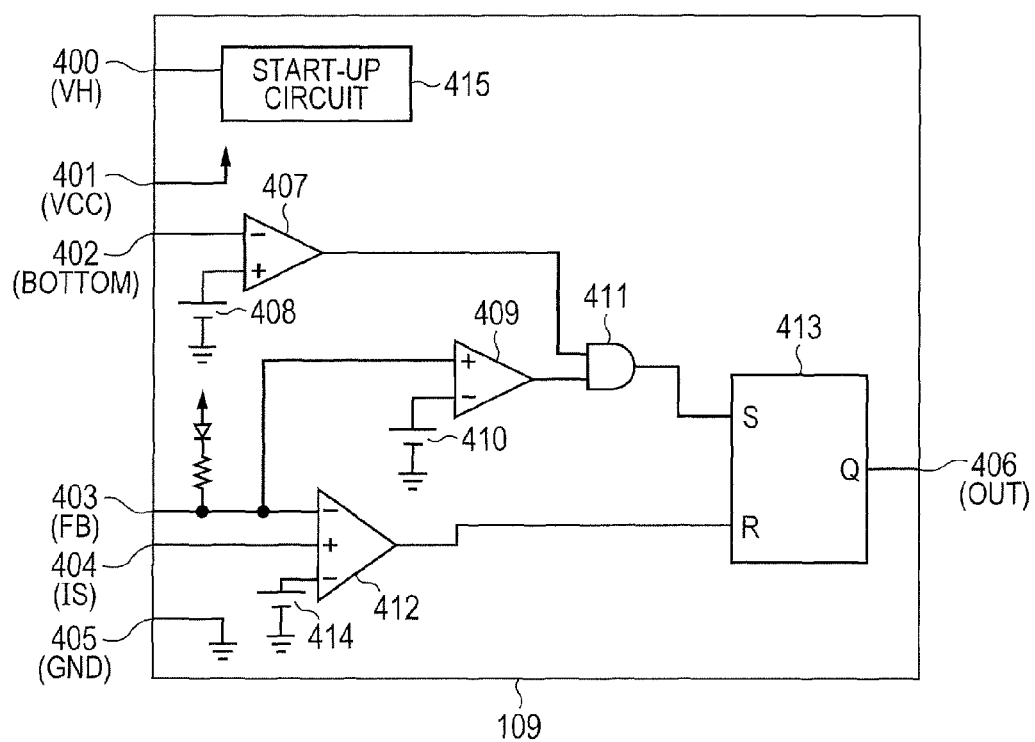
FIG. 10B illustrates a functional block diagram of a power supply IC.
Figure 11A:
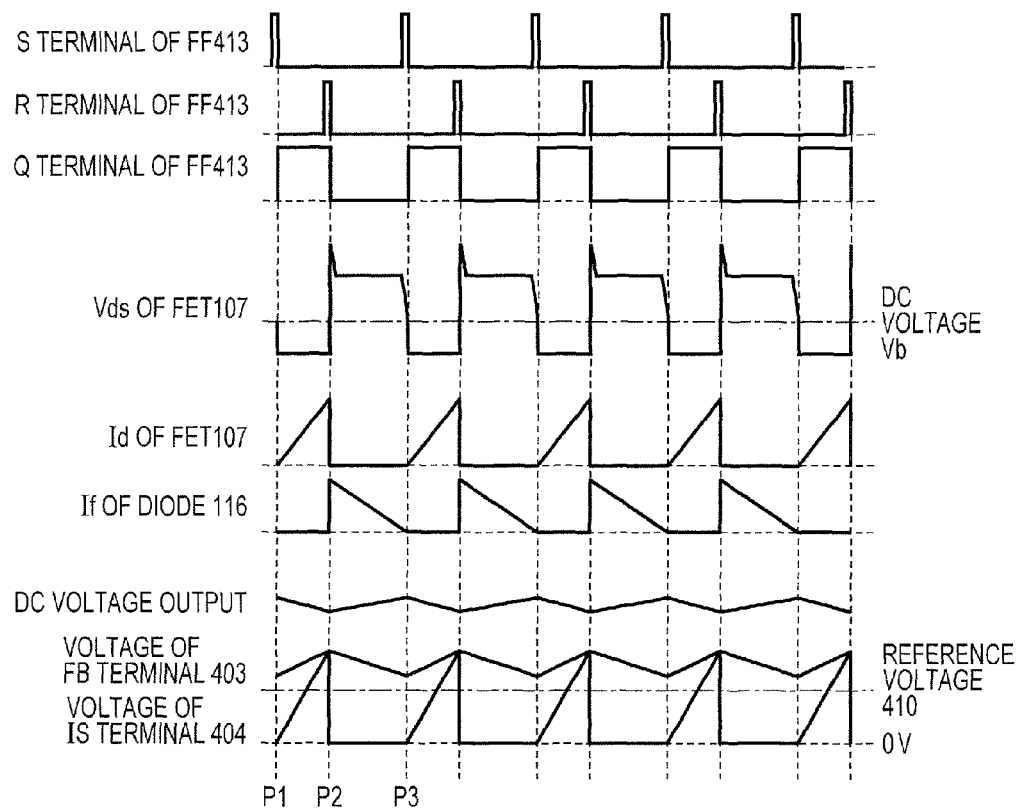
FIG. 11A illustrates a timing chart in a heavy load operation of the conventional DC power supply device.
Figure 11B:
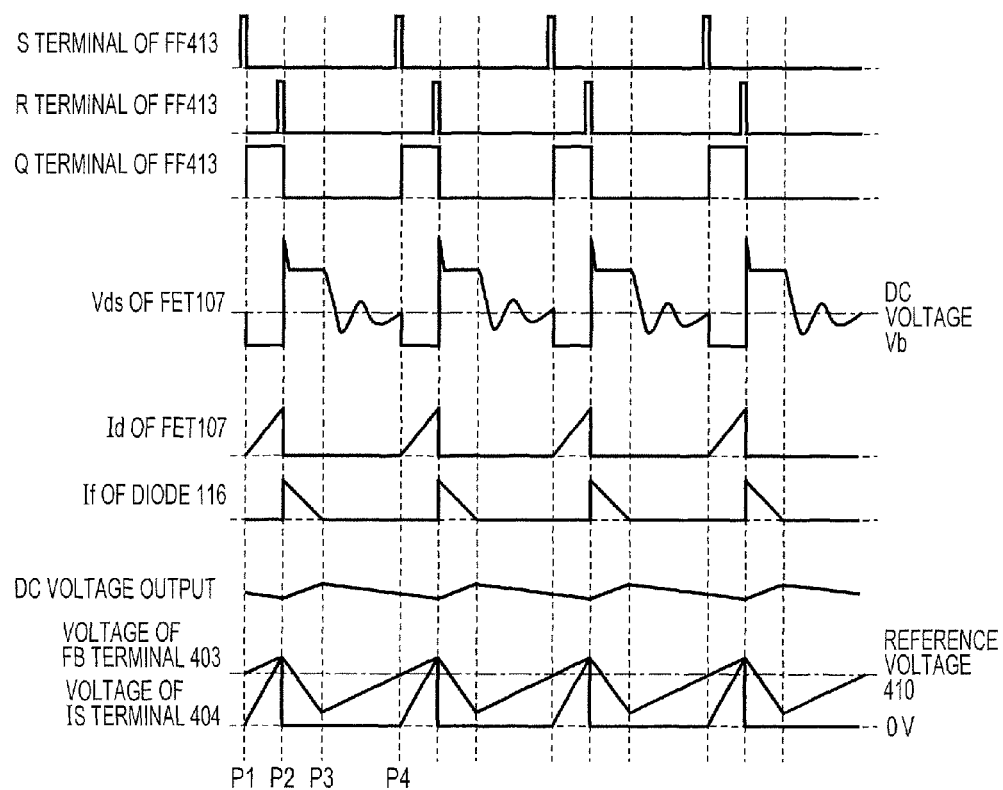
FIG. 11B illustrates a timing chart in a light load operation of the conventional DC power supply device.

FIG. 11A illustrates a timing chart of the DC power supply device illustrated in FIGS. 10A and 10B in a normal operation (that is, in heavy load operation), and FIG. 11B illustrates a timing chart thereof in a power-saving operation (that is, in light load operation). FIGS. 11A and 11B illustrate waveforms of a source-drain voltage Vds and a drain current Id of the FET 107, a current If flowing through the diode 116, the DC voltage output on the secondary side of the transformer 108, FB and IS terminal voltages of the power supply IC 109, and S, R, and Q terminal voltages of the FF 413. Referring to FIGS. 11A and 11B, the operation of the DC power supply device in the normal operation and the power-saving operation is described below.

(1) Operation of DC Power Supply Device in Normal Operation

The operation of the DC power supply device in the normal operation is described with reference to FIG. 11A.

1) Accumulation of Energy (Period from Timings P1 to P2 of FIG. 11A)

The timing P1 represents the timing at which the FET 107 becomes the ON state. In other words, in the power supply IC 109, a HIGH level signal (set signal) is input to the S terminal of the FF 413, and the output of the Q terminal becomes HIGH level. Accordingly, a HIGH level signal is output from the terminal 406 of the power supply IC 109, and a predetermined voltage is applied to the gate terminal of the FET 107. Then, the FET 107 becomes the ON state, and the drain current Id of the FET 107 increases linearly. As a result, energy is accumulated in the transformer 108 with the drain current Id of the FET 107. The potential of the voltage induced in the secondary winding Ns is a potential of reverse biasing the diode 116, and hence the current If does not flow through the diode 116 and the DC voltage output on the secondary side decreases. On the other hand, the input voltage of the FB terminal 403 of the power supply IC 109 gradually increases via the photocoupler 115. The input voltage of the IS terminal 404 of the power supply IC 109 also increases linearly similarly to the increase in drain current Id of the FET 107.

2) Regeneration of Energy (Period from Timings P2 to P3 of FIG. 11A)

The timing P2 represents the timing at which the FET 107 becomes the OFF state. When the input voltage of the IS terminal 404 of the power supply IC 109 becomes higher than the input voltage of the FB terminal 403, the comparator 412 outputs a HIGH level signal (reset signal) to be input to the R terminal of the FF 413. When the HIGH level signal is input to the R terminal of the FF 413, the Q terminal of the FF 413, that is, the OUT terminal 406 of the power supply IC 109 becomes LOW level. Then, the FET 107 becomes the OFF state because a predetermined voltage is not applied to the gate terminal of the FET 107, and hence the drain current Id of the FET 107 no longer flows. As a result, a voltage whose polarity is opposite to that when the FET 107 is in the ON state is induced in the secondary winding Ns. Then, the diode 116 becomes the conductive state, and the energy accumulated in the transformer 108 starts to flow as the current If of the diode 116 to increase the DC voltage output. Accordingly, the input voltage of the FB terminal 403 of the power supply IC 109 gradually decreases via the photocoupler 115. The input voltage of the IS terminal 404 of the power supply IC 109 also becomes 0 V because the FET 107 becomes the OFF state and the drain current Id no longer flows.

3) End of Regeneration of Energy→Reaccumulation (Timing P3 of FIG. 11A)

The timing P3 represents the timing at which the FET 107 becomes the ON state again. When the input voltage of the BOTTOM terminal 402 of the power supply IC 109, that is, the voltage induced in the auxiliary winding Nb becomes equal to or lower than the reference voltage 408 and when the input voltage of the FB terminal 403 becomes higher than the reference voltage 410, the AND circuit 411 outputs a HIGH level signal. Then, when the HIGH level signal is input to the S terminal of the FF 413 as a set signal, the OUT terminal 406 of the power supply IC 109 connected to the Q terminal becomes HIGH level, and the FET 107 becomes the ON state again. At the timing P3 at which the FET 107 becomes the ON state again, the operation is in the same state as that at the timing P1, and the above-mentioned series of operation cycles is repeated. In this way, a series of operation of the typical DC power supply device (power supply IC: operating in the current control mode with a variable frequency and a variable duty cycle) is performed.

(2) Operation of DC Power Supply Device in Power-Saving Operation

Next, the operation of the DC power supply device in the power-saving operation as an operating mode of reducing switching loss by reducing the number of switching operations of the FET 107 is described with reference to FIG. 11B. The operation of the DC power supply device at the timing P1 and the timing P2 is the same as that in the above-mentioned normal operation, and hence description thereof is omitted.

1) End of Regeneration of Energy (Period from Timings P3 to P4 of FIG. 11B)

The timing P3 represents the timing at which the energy accumulated in the transformer 108 up to the timing P2 is completely regenerated to the secondary side as a flyback current, that is, the timing at which the current If of the diode 116 no longer flows. When the DC power supply device performs the power-saving operation, the input voltage of the FB terminal 403 of the power supply IC 109 after the current If of the diode 116 stops flowing falls below the reference voltage 410 as illustrated in FIG. 11B. Accordingly, the output of the comparator 409 remains LOW level, and the condition of setting the S terminal of the FF 413 to HIGH level is not satisfied. Thus, the Q terminal of the FF 413 also remains LOW level, and the FET 107 cannot transition to the ON state. As a result, even after the current If of the diode 116 stops flowing, the OFF state of the FET 107 is continued. At this time, the drain-source voltage Vds of the FET 107 performs self-excited oscillation so as to converge to a DC voltage Vb on the primary side of the transformer 108, and the potential of the input voltage of the FB terminal 403 of the power supply IC 109 gradually increases along with the decrease in the secondary-side DC voltage output.

2) Reaccumulation of Energy (Timing P4 of FIG. 11B)

The timing P4 represents the timing at which the FET 107 becomes the ON state again. After the current If of the diode 116 stops flowing, electric power is consumed by the load 119 connected to the secondary side of the transformer 108, and hence the DC voltage output decreases. Accordingly, the input voltage of the FB terminal 403 of the power supply IC 109 gradually increases via the photocoupler 115. The increasing input voltage of the FB terminal 403 thereafter exceeds the reference voltage 410, and hence the comparator 409 outputs a HIGH level signal. When the input voltage of the BOTTOM terminal 402 of the power supply IC 109, that is, the voltage induced in the auxiliary winding Nb becomes equal to or lower than the reference voltage 408, the comparator 407 outputs a HIGH level signal, with the result that the AND circuit 411 outputs a HIGH level signal. As a result, a HIGH level signal (set signal) is input to the S terminal of the FF 413, and the OUT terminal 406 of the power supply IC 109 connected to the Q terminal becomes HIGH level. Then, a predetermined voltage is applied to the gate terminal of the FET 107, and the FET 107 becomes the ON state again. At the timing P4 at which the FET 107 becomes the ON state again, the operation is in the same state as that at the timing P1, and a series of operation cycles from the timing P1 to the timing P4 is repeated.

Now, a supplementary description is given of the operation of the DC power supply device in the light load state. As described above, the timing at which the FET 107 becomes the ON state is the timing when the input voltage of the BOTTOM terminal 402 of the power supply IC 109 becomes equal to or lower than the reference voltage 408 and the input voltage of the FB terminal 403 becomes higher than the reference voltage 410. As illustrated in FIG. 11A, in the heavy load state, the input voltage of the FB terminal 403 is sufficiently higher than the reference voltage 410, and hence the DC power supply device brings the FET 107 into the ON state at the timing at which the input voltage of the BOTTOM terminal 402 becomes equal to or lower than the reference voltage 408. In the light load state, however, the input voltage of the FB terminal 403 is low, and becomes lower than the reference voltage 410 in the period during which the energy accumulated in the transformer 108 is regenerated to the secondary side as a flyback current. As a result, the FET 107 does not become the ON state unless the input voltage of the FB terminal 403 becomes higher than the reference voltage 410 after the flyback current stops flowing. Thus, in the light load state, the intermittent operation having a long period of the OFF state as illustrated in FIG. 11B is performed. The DC power supply device operates as described above in the light load operation, thus being capable of reducing the number of switching operations to save energy.

Figure 12:
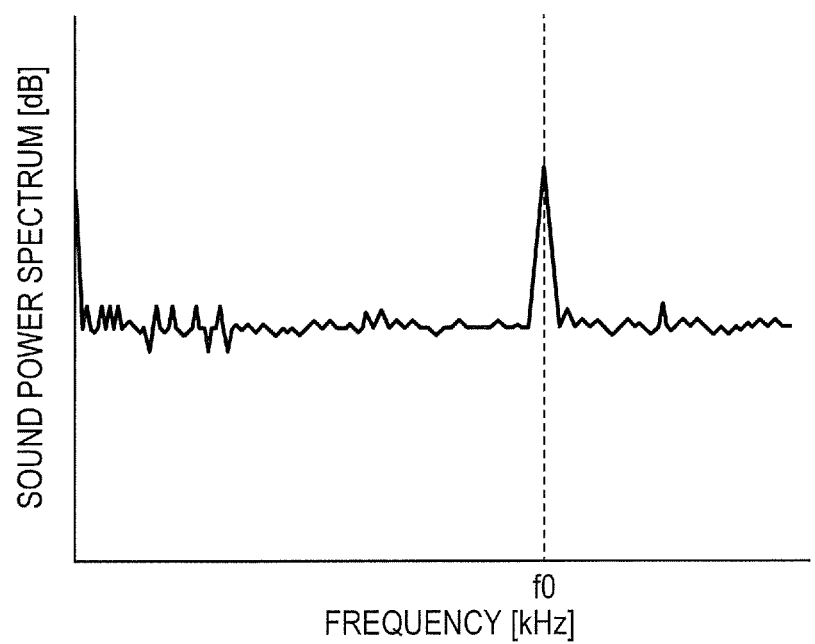
FIG. 12 shows the sound pressure level of a transformer in the light load operation of the conventional DC power supply device.

Next, FIG. 12 shows an example of the sound pressure level of the transformer 108 in the light load operation. In FIG. 12, the horizontal axis represents the frequency (Frequency) (in kilohertz (kHz)) and the vertical axis represents the sound pressure level (Sound Power Spectrum) (in decibel (dB)). FIG. 12 shows the case where the switching frequency of the FET 107 in the light load operation matches with the resonant frequency (f0 kilohertz) of the transformer. Accordingly, as shown in FIG. 12, vibration noise having a high peak of the sound pressure level at the resonant frequency (f0 kilohertz) of the transformer 108 is generated. When the resonant frequency (f0) is within the human audible frequency range, the vibration noise is audible as harsh noise.

First Embodiment

In this embodiment, description is given below of a DC power supply device in which a turn-ON time of the FET 107 is shortened at a specific switching frequency to reduce energy to be accumulated in the transformer, to thereby reduce vibration noise of the transformer.

[Outline of Correction Circuit]

FIG. 1 illustrates a circuit configuration of the DC power supply device in this embodiment. The circuit configuration of FIG. 1 is different from the conventional circuit configuration of FIG. 10A described above in that an IS terminal voltage correction circuit 500 is provided in front of the IS terminal 404 of the power supply IC 109 for detecting a drain current Id of the FET 107. The IS terminal voltage correction circuit 500 (hereinafter referred to as "correction circuit 500") is a circuit for changing the voltage waveform input to the IS terminal 404 in accordance with the switching frequency when the FET 107 is in the OFF state. The circuit configuration illustrated in FIG. 1 and the internal configuration of the power supply IC 109 are the same as those in FIGS. 10A and 10B, respectively, except for the correction circuit 500. Description thereof is therefore omitted.

Figure 2A:
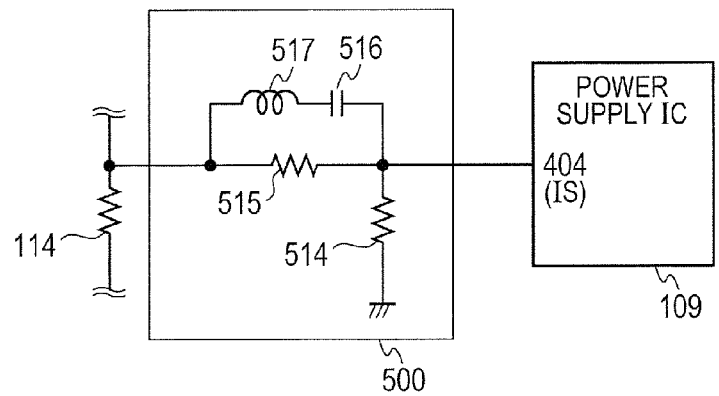
FIG. 2A illustrates a circuit configuration of an IS terminal voltage correction circuit according to the first embodiment of the present invention.

FIG. 2A illustrates a circuit configuration of the correction circuit 500. In FIG. 2A, a resistor 514 (second resistor) and a resistor 515 (first resistor) are voltage dividing resistors. A coil 517 and a capacitor 516 connected in series form a series LC circuit for oscillating an input voltage of the IS terminal 404 (hereinafter referred to also as "IS voltage") when the FET 107 is in the OFF state. Respective constants of the coil 517 and the capacitor 516 of the series LC circuit are set so that an oscillation frequency becomes equal to a resonant frequency (f0) of the transformer 108.

Figure 2B:
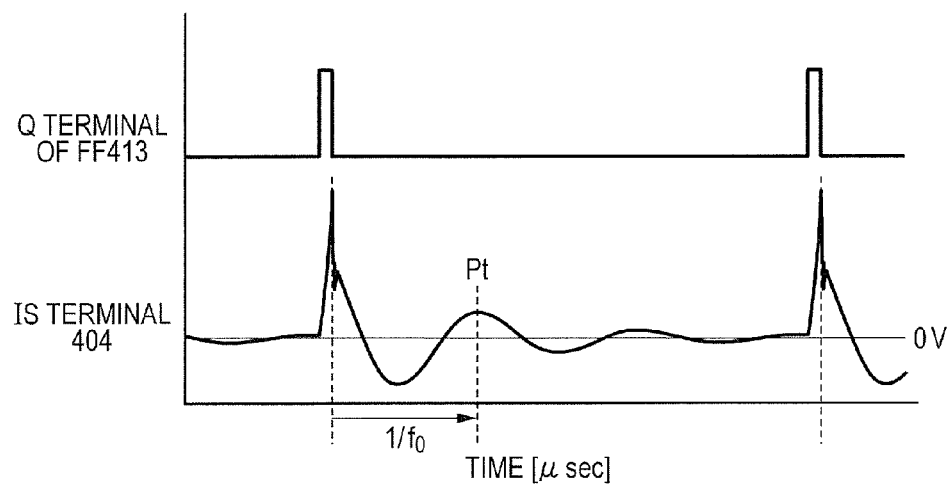
FIG. 2B is a graph showing a waveform of an IS terminal voltage.

FIG. 2B is a graph showing the relationship between an output waveform of the Q terminal of the FF 413 included in the power supply IC 109, which is the input to the gate terminal of the FET 107, and a waveform of the input voltage to the IS terminal 404 of the power supply IC 109. The horizontal axis represents time (in μsec (microseconds)). FIG. 2B shows the waveform of the input voltage of the IS terminal 404 in the case where an intermittent operation time of the FET 107 is sufficiently long. It is understood from FIG. 2B that, when the output of the Q terminal of the FF 413 of the power supply IC 109 changes from HIGH level to LOW level and the FET 107 accordingly changes from the ON state to the OFF state, the waveform of the input voltage of the IS terminal 404 performs self-excited oscillation centered around 0 V, and converges gradually to 0 V. It is also understood from FIG. 2B that the input voltage of the IS terminal 404 has a positive voltage value in the vicinity of a resonant cycle (timing Pt of FIG. 2B) calculated as the reciprocal of the resonant frequency (f0) of the transformer 108.

In the above-mentioned conventional example, as illustrated in FIGS. 11A and 11B, the IS voltage in the state where the FET 107 is OFF has a constant value (=0 V) regardless of the switching frequency. In this embodiment, on the other hand, the IS voltage in the state where the FET 107 is OFF is variable rather than constant because of the self-excited oscillation by the correction circuit 500. In this embodiment, by utilizing the variable IS voltage, the turn-ON time of the FET 107 is adjusted in accordance with the switching frequency of the FET 107.

[Outline of Operation of DC Power Supply Device]

Next, the operation of the DC power supply device illustrated in FIG. 1 according to this embodiment in the case where the DC power supply device operates in the power-saving state and the switching frequency of the FET 107 substantially matches with the resonant frequency of the transformer is described with reference to a timing chart of FIG. 3A. The case where the switching frequency of the FET 107 substantially matches with the resonant frequency of the transformer refers to the case where the switching frequency of the FET 107 falls within a predetermined frequency band centered around the resonant frequency of the transformer. The same holds true for the following embodiments. Respective signals illustrated in FIG. 3A and the operation of the power supply IC at timings P1 to P4 are the same as those in the conventional example of FIG. 11B, and hence description thereof is omitted.

(1) Operation in Vicinity of Resonant Frequency of Transformer 108

Figure 3A:
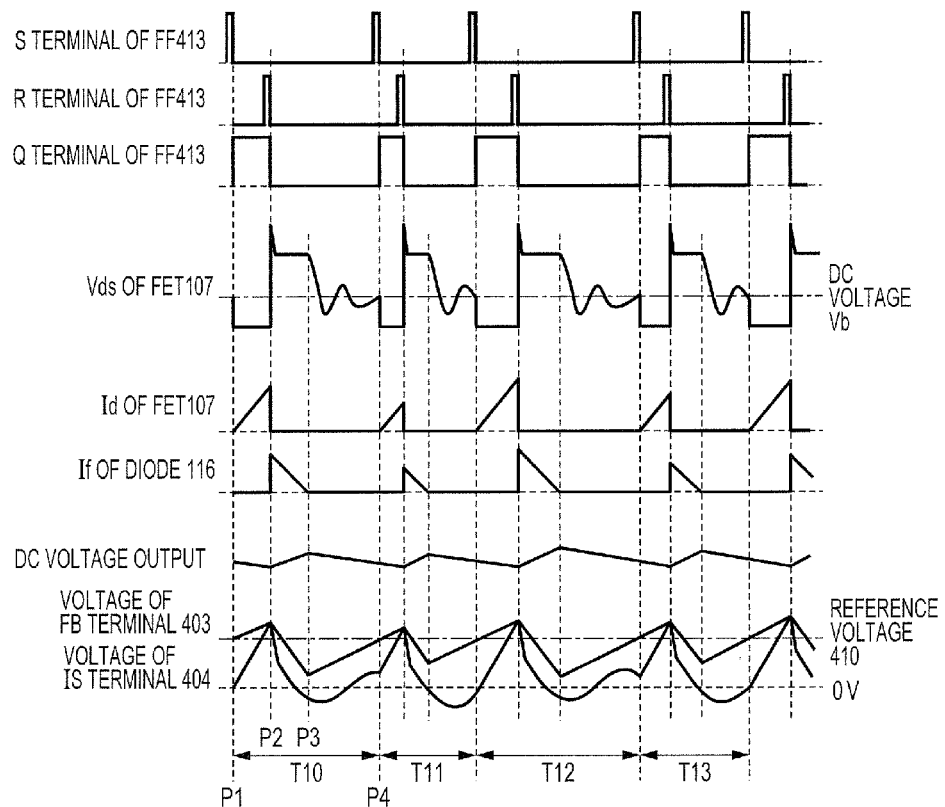
FIG. 3A illustrates a timing chart in a light load operation of the DC power supply device according to the first embodiment of the present invention.

In FIG. 3A, at the timing (timing P4) at which the switching frequency of the FET 107 matches with the cycle of the resonant frequency (f0) of the transformer, such as T10 or T12, the voltage input to the IS terminal 404 is a voltage higher than 0 V because of the correction circuit 500 as described above. At the timing P4, when the FET 107 becomes the ON state, the voltage of the IS terminal increases along with the increase in drain current Id. The IS voltage in the state where the FET 107 is ON is higher than 0 V, and hence the timing at which the IS voltage exceeds the voltage input to the FB terminal 403 is advanced as compared with the conventional example of FIG. 11B. As a result, the turn-ON time of the FET 107 is shortened. Thus, the amount of the current flowing through the transformer 108 in the state where the FET 107 is ON is reduced, and the electromagnetic force acting on the core of the transformer 108 is weakened correspondingly. Therefore, vibration noise generated when the transformer 108 is driven at the resonant frequency is reduced.

(2) Operation after Shortening Conductive Time of FET 107

The turn-ON time of the FET 107 has been shortened, and hence the energy to be accumulated in the transformer 108 also decreases correspondingly. After that, in order to interpolate the decreased energy, in this embodiment, the FET 107 is driven in a cycle having a frequency higher than the resonant frequency of the transformer 108 as shown by T11 or T13 of FIG. 3A. Because the switching frequency of the FET 107 is shifted, the turn-ON time of the FET 107 is shortened, and the decreased amount of the input voltage of the FB terminal 403, which decreases along with the current value of the flyback current supplied to the secondary side of the transformer 108, also becomes smaller. As a result, the time necessary for the input voltage of the FB terminal 403 to exceed the reference voltage 410 is shortened so that the FET 107 becomes the ON state again in a short cycle.

Figure 3B:
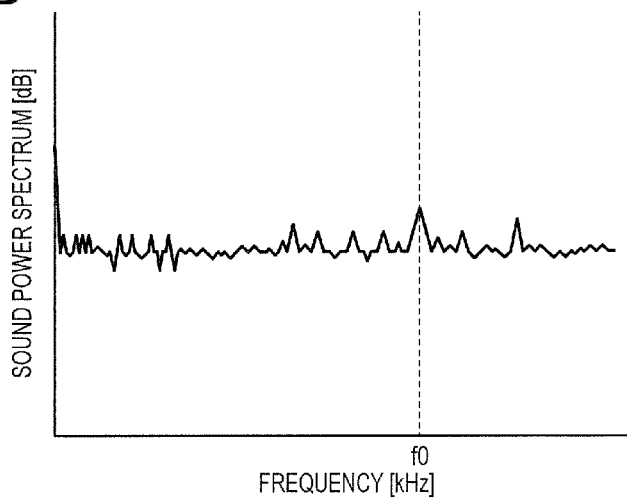
FIG. 3B shows the sound pressure level of a transformer in the light load operation.

FIG. 3B is a graph showing an example of the sound pressure level of the transformer 108 in the light load operation of the DC power supply device according to this embodiment. The horizontal axis represents the frequency (in kilohertz (kHz)) and the vertical axis represents the sound pressure level (in decibel (dB)). f0 in FIG. 3B represents the resonant frequency of the transformer 108. It is understood from FIG. 3B that the sound pressure level at the resonant frequency (f0) of the transformer 108 is reduced as compared with FIG. 12 showing the relationship between the frequency and the sound pressure level in the conventional example. It is also understood that there are peak values at frequencies other than the resonant frequency (f0) of the transformer 108 although the sound pressure level is small. The peaks are generated because the switching frequency is shifted in order to suppress the switching of the FET 107 at the resonant frequency (f0) of the transformer 108.

As described above, according to this embodiment, the vibration noise generated from the transformer in the light load operation can be reduced, and power consumption can be reduced. According to the DC power supply device in this embodiment, when the switching frequency substantially matches with the resonant frequency of the transformer, the control of shortening the turn-ON time of the FET and the control of shifting the switching frequency is repeated, to thereby output a desired stable voltage. In other words, in the case of driving the FET at a frequency matching with the resonant frequency of the transformer at which the vibration noise of the transformer is conspicuously generated, the turn-ON time of the FET is shortened. The current amount supplied to the secondary side of the transformer becomes insufficient due to the shortened turn-ON time of the FET, but the current amount is interpolated by the subsequent control of shortening the switching interval (cycle) of the FET. In this way, the stable supply of the DC voltage output on the secondary side of the transformer and the reduction in harsh vibration noise of the transformer can be realized at the same time.

In this embodiment, the power supply IC is used for the signal control of the FET as a switching element, but another means may be used as long as the same effect can be obtained. In this embodiment, the correction circuit in which the voltage dividing resistor and the series LC circuit are connected in parallel is used for the correction of the IS voltage, but another circuit configuration may be used as long as the same effect, that is, the effect of shortening the turn-ON time of the FET in the vicinity of the resonant frequency of the transformer can be obtained. Further, although omitted in the circuit configuration in this embodiment, a protection diode against the negative voltage application to the IS terminal may be added to the correction circuit.

Second Embodiment

In this embodiment, description is given below of a DC power supply device in which the timing of turning ON the FET (switching cycle) is delayed so that the FET does not become conductive at a specific frequency, that is, the resonant frequency of the transformer, to thereby reduce vibration noise of the transformer.

[Outline of Correction Circuit]

FIG. 4A illustrates a circuit configuration of the DC power supply device in this embodiment. The circuit configuration of FIG. 4A is different from the above-mentioned circuit configuration of the conventional DC power supply device of FIG. 10A in the following points. That is, a regulation resistance correction circuit 501 is inserted and connected in parallel to the resistor 123 (first resistor) provided on the secondary side of the transformer 108, and a control unit 800 for controlling the regulation resistance correction circuit 501 and a memory 801 are provided in the load 119. The circuit configurations of the first embodiment and this embodiment are different in that the regulation resistance correction circuit 501 (hereinafter referred to as "correction circuit 501"), the control unit 800, and the memory 801 are provided instead of the correction circuit 500. The circuit configuration illustrated in FIG. 4A and the internal configuration of the power supply IC 109 are the same as those in FIGS. 10A and 10B, respectively, except for the correction circuit 501. Description thereof is therefore omitted.

FIG. 4B illustrates a circuit configuration of the correction circuit 501. In FIG. 4B, a correction resistor 521 (third resistor) is provided in order to correct a voltage input to the reference terminal of the shunt regulator 125. A switch 522 is switched to be short-circuited (ON) and open (OFF) in response to a switch control signal from the control unit 800 (for example, CPU or ASIC) provided in the load 119 and in accordance with the operating state of the power supply.

When the switch 522 is short-circuited (ON) in response to the switch control signal of HIGH level from the control unit 800, the regulation resistor 123 and the correction resistor 521 are connected in parallel, and a combined resistance value of the two resistors becomes smaller than the resistance value of the regulation resistor 123. As a result, based on the proportional relationship of the resistance value of the voltage divided by the regulation resistor 124 (second resistor) and the resistor 123, the voltage input to the reference terminal of the shunt regulator 125, which is connected to the node between the resistor 123 and the resistor 124, increases. In order to cancel out the increase in voltage, the shunt regulator 125 decreases the output voltage of the cathode terminal to perform the control of increasing the current flowing into a light emitting diode (LED) in the photocoupler 115. The amount of the current flowing into the light emitting diode (LED) in the photocoupler 115 is increased, and hence a collector current of the phototransistor in the photocoupler 115 increases, to thereby suppress the increased amount of the input voltage of the FB terminal 403 of the power supply IC 109.

This control is performed in a turn-OFF time of the FET 107 which is the inactive period of the transformer 108, and hence the increase in input voltage of the FB terminal of the power supply IC 109 can be suppressed to extend the turn-OFF time of the FET 107, thus delaying the timing of turning ON the FET 107. As a result, the transformer 108 can be driven at a frequency other than the resonant frequency of the transformer 108. The operation of the DC power supply device in the normal operation and the internal configuration of the power supply IC 109 are the same as the conventional ones, and hence description thereof is omitted.

[Outline of Operation of DC Power Supply Device]

Figure 5A:
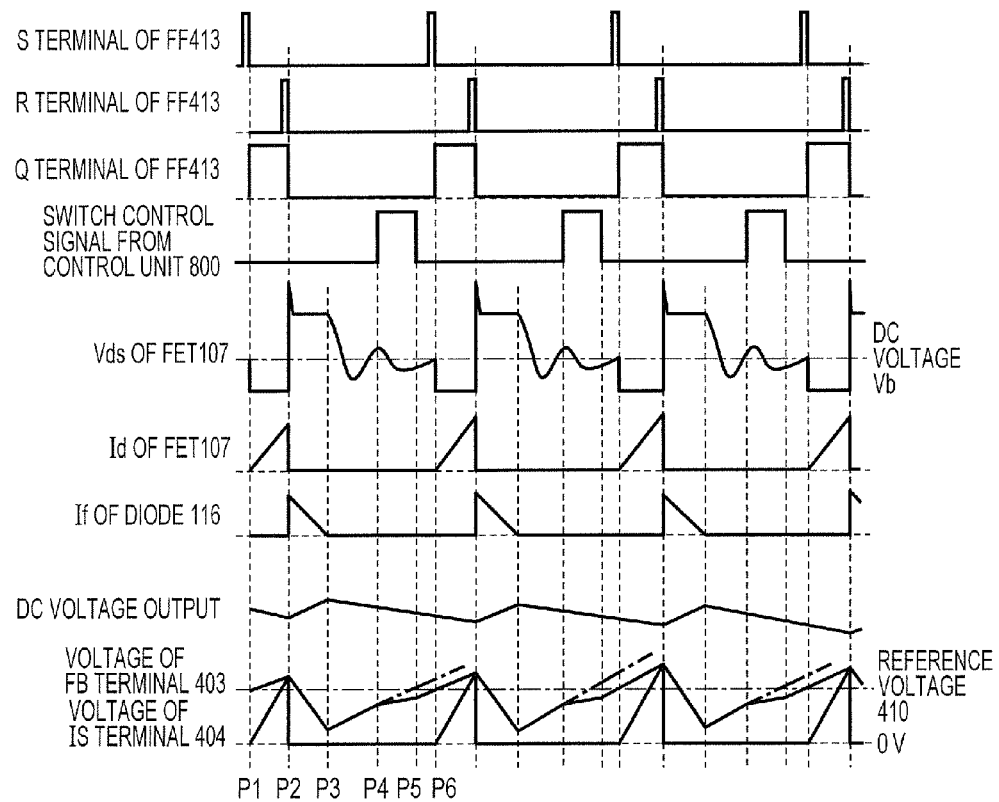
FIG. 5A illustrates a timing chart in a light load operation of the DC power supply device according to the second embodiment of the present invention.

Next, the operation of the DC power supply device illustrated in FIG. 4A according to this embodiment in the case where the DC power supply device operates in the power-saving state and the switching frequency of the FET 107 substantially matches with the resonant frequency of the transformer is described with reference to a timing chart of FIG. 5A. The operation of the power supply IC at timings P1 to P3 of FIG. 5A is the same as that in the conventional example of FIG. 11B, and hence description thereof is omitted.

(1) Control of Suppressing Increase in Input Voltage of FB Terminal

The control unit 800 provided in the load 119 on the secondary side of the transformer 108 monitors the state of the FET 107 based on, for example, voltage fluctuations on the secondary side of the transformer 108. At the timing (timing P2) at which the FET 107 becomes the OFF state and the DC voltage output increases, the control unit 800 starts a timer (not shown) included in the control unit 800, and measures the switching cycle of the FET 107. When the timer value of the timer approaches the resonant cycle of the transformer 108 stored in the memory 801, the control unit 800 outputs a switch control signal of HIGH level to the correction circuit 501 (timing P4) so as to avoid the FET 107 from becoming the ON state. Accordingly, the switch 522 in the correction circuit 501 is turned ON to adjust a reference voltage of the shunt regulator 125. As a result, as described above, the increase in input voltage of the FB terminal 403 of the power supply IC 109 can be suppressed to avoid the FET 107 from becoming the ON state again in the resonant cycle of the transformer 108. In other words, if the switch 522 in the correction circuit 501 is not turned ON from the timings P4 to P5, the input voltage of the FB terminal 403 increases with an increasing curve represented by a dashed line. However, the switch 522 is turned ON, and hence the input voltage of the FB terminal 403 increases gradually with an increasing curve represented by a solid line.

After that, when the control unit 800 determines from the timer value of the timer that the timer value has sufficiently passed the resonant cycle of the transformer 108, the control unit 800 outputs a switch control signal of LOW level to the correction circuit 501 so that the FET 107 becomes conductive again (timing P5). Accordingly, the switch 522 in the correction circuit 501 is turned OFF, and the reference voltage of the shunt regulator 125 is returned to the normal voltage. As a result, the voltage input to the FB terminal 403 of the power supply IC 109 increases with the same inclination as the increasing curve represented by the dashed line, and after that, the voltage value of the FB terminal 403 exceeds the reference voltage 410. Thus, the FET 107 becomes the ON state again (timing P6). Through the above-mentioned control, the switching of the FET 107 at the resonant frequency of the transformer 108 at which vibration energy is high can be avoided to reduce the vibration noise of the transformer 108.

Figure 5B:
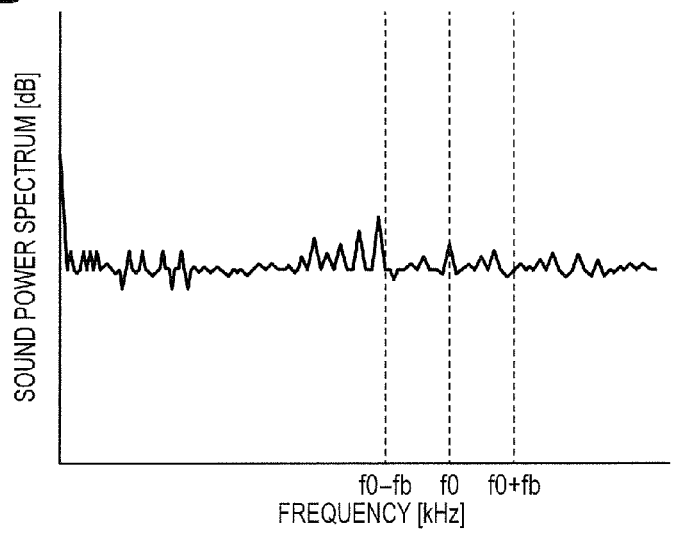
FIG. 5B shows the sound pressure level of a transformer in the light load operation.

FIG. 5B is a graph showing an example of the sound pressure level of the transformer 108 in the light load operation of the DC power supply device according to this embodiment. The horizontal axis represents the frequency (in kilohertz (kHz)) and the vertical axis represents the sound pressure level (in decibel (dB)). "f0" in FIG. 5B represents the resonant frequency of the transformer 108, and the frequency band from (f0−fb) to (f0+fb) represents a driving frequency band of the FET 107 in which the switching operation is avoided by controlling ON/OFF of the switch 522 by the control unit 800.

It is understood from FIG. 5B that the sound pressure level in the frequency band from (f0−fb) to (f0+fb) centered around the resonant frequency (f0) of the transformer 108 is reduced by the control described in this embodiment. It is also understood from FIG. 5B that there are peak values in a frequency band lower than the frequency (f0−fb) although the sound pressure level is small. The peaks are generated because the switching frequency of the FET 107 is shifted by the above-mentioned control.

As described above, according to this embodiment, the vibration noise generated from the transformer in the light load operation can be reduced, and power consumption can be reduced. The DC power supply device in this embodiment monitors the driving frequency of the transformer, adjusts the reference resistance value of the shunt regulator in a predetermined period, and performs the control of avoiding the FET from being conductive again at the resonant frequency of the transformer at which the vibration noise of the transformer is conspicuously generated. In this way, the stable supply of the DC voltage output on the secondary side of the transformer and the reduction in harsh vibration noise of the transformer can be realized at the same time.

In this embodiment, the correction resistor for correcting the regulation resistor value is provided to perform the control of correcting the switching frequency so that the FET does not operate in the resonant cycle of the transformer. Another means (for example, a configuration including a filter circuit whose impedance varies in accordance with a specific frequency (the resonant frequency of the transformer)) may be used as long as the effect of correcting the switching frequency of the FET can be obtained under the same conditions.

Third Embodiment

In this embodiment, description is given below of a DC power supply device in which the turn-ON time of an FET as a switching element is controlled in accordance with a switching frequency with the use of a control IC formed of a digital circuit instead of the power supply IC for power supply control used in the first and second embodiments.

Figure 6:
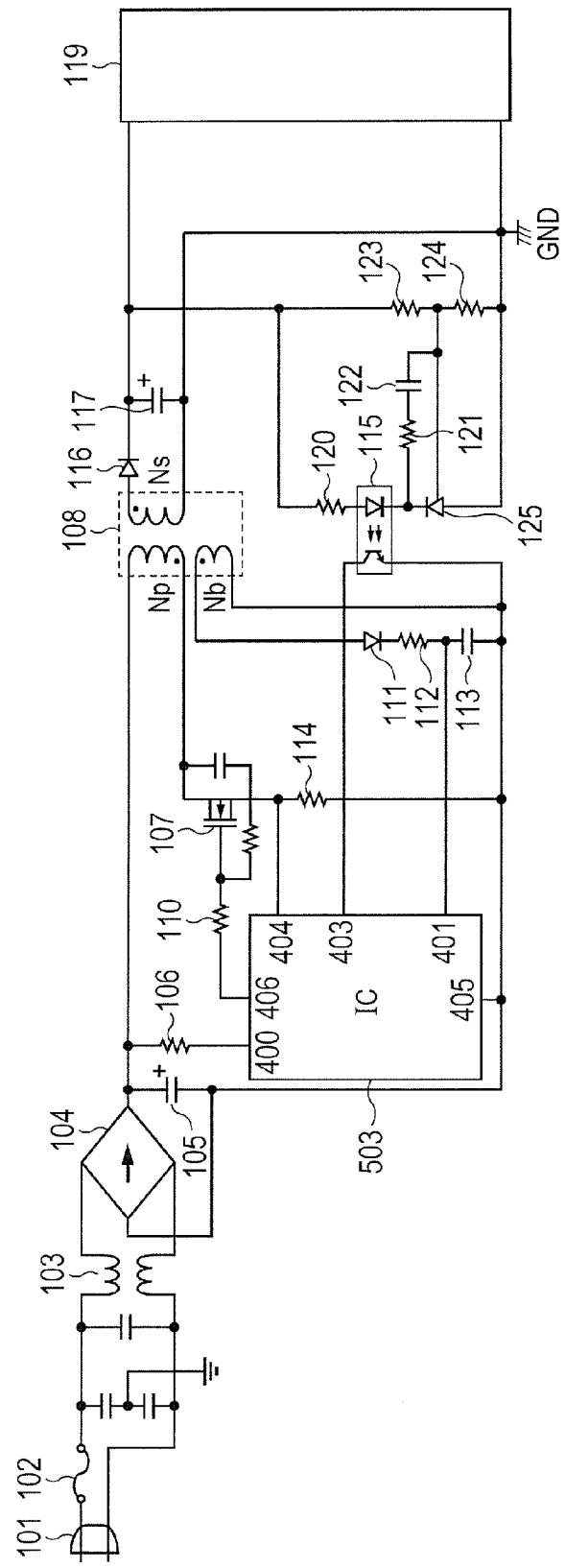
FIG. 6 illustrates a circuit configuration of a DC power supply device according to third and fourth embodiments of the present invention.

FIG. 6 illustrates a circuit configuration of the DC power supply device in this embodiment. FIG. 6 of this embodiment is different from FIG. 10A of the conventional example, FIG. 1 of the first embodiment, and FIG. 4A of the second embodiment in that, while the drive control of the FET 107 in the conventional example and the first and second embodiments is performed by the power supply IC 109, the drive control of the FET 107 in this embodiment is performed by a control IC 503. The circuit configuration except for the control IC 503 (hereinafter referred to as "IC 503") is the same as in the conventional example, and hence description thereof is omitted. The operation of the DC power supply device in the normal operation is also the same as in the conventional example, and hence description thereof is omitted.

[Outline of Power Supply IC]

Figure 7A:
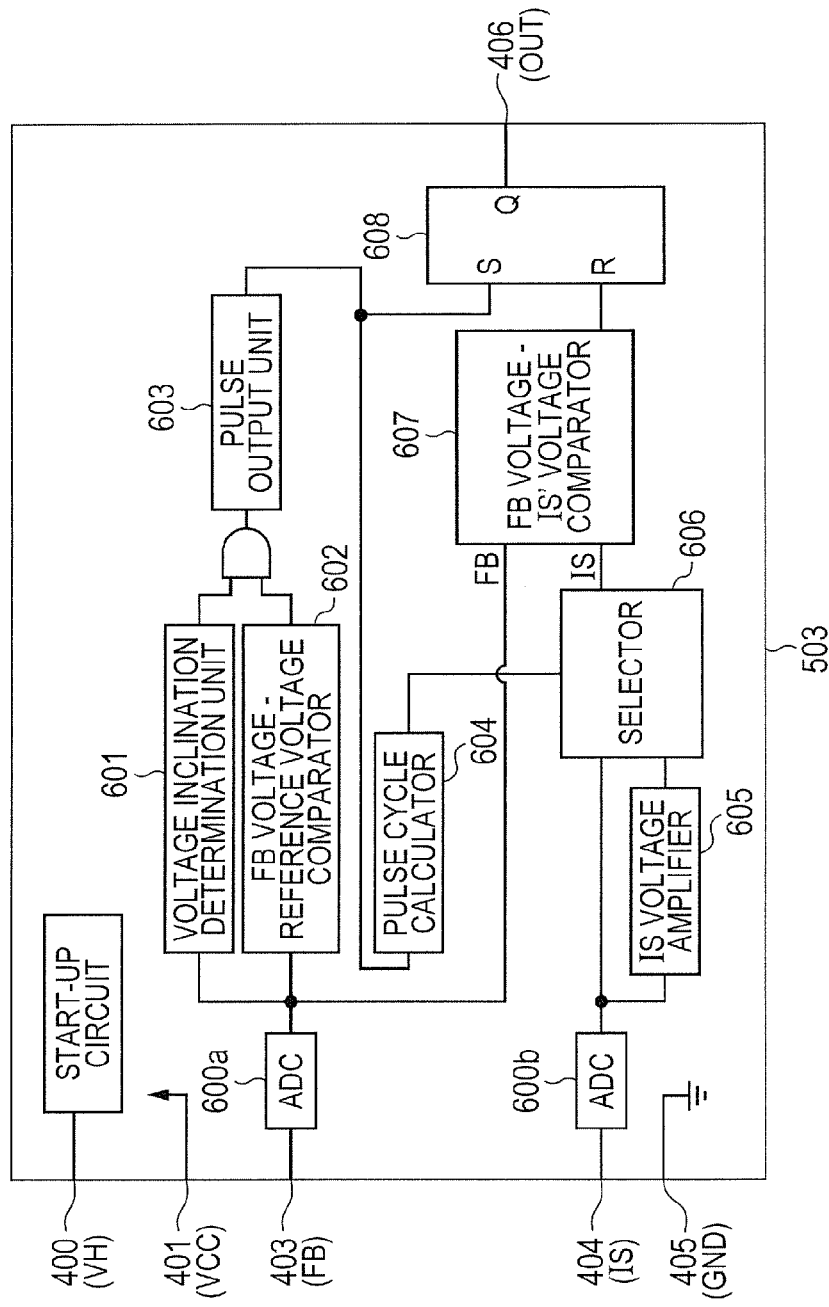
FIG. 7A illustrates a functional block diagram of a control IC according to the third embodiment of the present invention.

FIG. 7A is a functional block diagram illustrating an internal configuration of the IC 503 for controlling the FET 107 used in this embodiment. In FIG. 7A, the terminals 400, 401, and 403 to 406 are denoted by the same terminal numbers as those in the power supply IC 109 used in the first and second embodiments, and their input signals and output signals are also the same as those in the power supply IC 109, and hence description thereof is omitted. The terminal 402 is used in the power supply IC 109 as the BOTTOM terminal, but the terminal 402 is not used in the IC 503.

In FIG. 7A, AD converters 600a and 600b each convert (A/D convert) an input analog voltage value into a digital voltage value. A voltage inclination determination unit 601 detects the A/D-converted input voltage value of the FB terminal 403 multiple times to determine the inclination of the voltage value based on detection results at two points. Based on the inclination of the detected voltage value, the voltage inclination determination unit 601 detects the end of the flow-in of the flyback current on the secondary side of the transformer 108 (end of regeneration). When the input voltage value has an increasing inclination, the voltage inclination determination unit 601 determines that the flow-in of the flyback current has ended, and outputs a HIGH level signal. When the input voltage value has a decreasing inclination, the voltage inclination determination unit 601 determines that the flyback current is now caused to flow in, and outputs a LOW level signal. An FB voltage-reference voltage comparator 602 (hereinafter referred to also as "reference voltage comparator 602") detects whether or not the A/D-converted input voltage of the FB terminal 403 has exceeded the reference voltage 410. When the A/D-converted input voltage of the FB terminal 403 has exceeded the reference voltage 410, the reference voltage comparator 602 outputs a HIGH level signal. When the A/D-converted input voltage of the FB terminal 403 has not exceeded the reference voltage 410, the reference voltage comparator 602 outputs a LOW level signal. A pulse output unit 603 outputs a pulse signal of HIGH level when the output from the voltage inclination determination unit 601 and the output from the FB voltage-reference voltage comparator 602 are both HIGH level.

A pulse cycle calculator 604 (hereinafter referred to also as "cycle calculator 604") measures the cycle of the pulse signal output from the pulse output unit 603 to calculate a driving frequency of the FET 107, and outputs a voltage amplification designation signal to a selector 606 based on the calculated driving frequency. An IS voltage amplifier 605 outputs a signal obtained by amplifying the A/D-converted input voltage of the IS terminal 404 by a predetermined gain. The selector 606 outputs the A/D-converted input voltage of the IS terminal 404 or the voltage amplified by the IS voltage amplifier 605 in accordance with a selection signal (voltage amplification designation signal) output from the pulse cycle calculator 604. An FB voltage-IS' voltage comparator 607 (hereinafter referred to also as "IS' voltage comparator 607") compares the A/D-converted input voltage of the FB terminal 403 (FB voltage) and the voltage (IS' voltage) output from the selector 606. When the IS' voltage is higher, the IS' voltage comparator 607 outputs a HIGH level signal. In an RS flip-flop 608 (hereinafter referred to as "FF 608"), the output of a Q terminal becomes HIGH level when a pulse signal is input to an S terminal, and the output of the Q terminal becomes LOW level when a pulse signal is input to an R terminal.

[Outline of Operation of DC Power Supply Device]

Next, the internal operation of the IC 503 according to this embodiment in the case of the power-saving operation and in the case where the switching frequency of the FET 107 substantially matches with the resonant frequency of the transformer is described with reference to a timing chart of FIG. 7B.

Figure 7B:
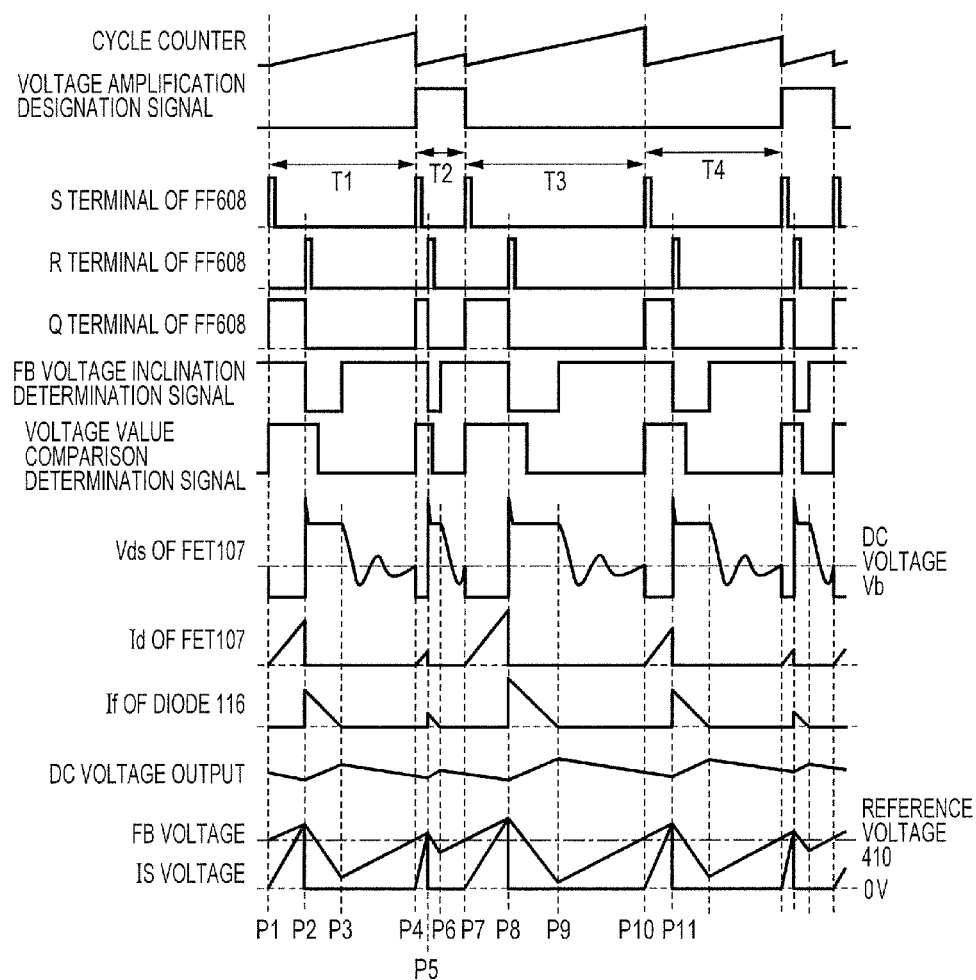
FIG. 7B illustrates a timing chart in a light load operation of the DC power supply device.

FIG. 7B illustrates waveforms of S, R, and Q terminal voltages of the FF 608, a source-drain voltage Vds and a drain current Id of the FET 107, a current If flowing through the diode 116, and the DC voltage output on the secondary side of the transformer 108, and also illustrates voltage waveforms of the following signals. A "cycle counter" represents a counter value of a counter provided in the pulse cycle calculator 604 in order to measure the cycle of the pulse signal output from the pulse output unit 603. The pulse cycle calculator 604 sends the "voltage amplification designation signal" as a selection signal to the selector 606 when the counter value of the cycle counter is a value within a predetermined range. The cycle counter and the voltage amplification designation signal are reset in response to the pulse signal output from the pulse output unit 603. An "FB voltage inclination determination signal" is a signal representing the output from the voltage inclination determination unit 601, which becomes HIGH level when the FB voltage value is increasing (when the FB voltage has a positive inclination) and LOW level when the FB voltage value is decreasing (when the FB voltage has a negative inclination). A "voltage value comparison determination signal" is a signal representing the output from the FB voltage-reference voltage comparator 602, which becomes HIGH level when the FB voltage is higher than the reference voltage 410 and LOW level when the FB voltage is lower than the reference voltage 410. The "FB voltage" and the "IS' voltage" represent the voltage waveforms of the inputs of the FB voltage-IS' voltage comparator 607.

(1) Determination of Conductive (ON) State of FET 107

The voltage inclination determination unit 601 outputs HIGH level when detecting that the regeneration of energy by the transformer 108 has ended and the input voltage of the FB terminal 403 of the IC 503 has a positive inclination (intervals between P3 to P5, P6 to P8, and P9 to P11 of FIG. 7B). When the FB voltage-reference voltage comparator 602 outputs HIGH level when detecting that the input voltage of the FB terminal 403 has exceeded the reference voltage 410 (timings P1, P4, P7, and P10). When the HIGH level signals are simultaneously output from the voltage inclination determination unit 601 and the FB voltage-reference voltage comparator 602, the pulse output unit 603 outputs a pulse signal of HIGH level. In the FF 608, when the pulse signal (set signal) output from the pulse output unit 603 is input to the S terminal, the output of the Q terminal becomes HIGH level, and the output voltage of the Q terminal is applied to the gate terminal of the FET 107 via the OUT terminal 406 so that the FET 107 becomes the ON state.

The pulse cycle calculator 604 measures the cycle (period from T1 to T4 shown in FIG. 7B) of the pulse signal output from the pulse output unit 603. Then, when the measured cycle of the pulse signal is included in a predetermined cycle range centered around a predetermined resonant cycle of the transformer 108, the pulse cycle calculator 604 outputs a selection signal (voltage amplification designation signal) of HIGH level to the selector 606. In response to the selection signal, the output from the IS voltage amplifier 605 is selected as the output from the selector 606. In FIG. 7B, T1 and T4 are included in a predetermined cycle range centered around the resonant cycle of the transformer 108, and hence the pulse cycle calculator 604 outputs the voltage amplification designation signal of HIGH level. The cycle counter provided in the pulse cycle calculator 604 is initialized in response to the pulse signal output from the pulse output unit 603, and starts to measure the next cycle of the pulse signal.

(2) Determination of Non-Conductive (OFF) State of FET 107

When the FET 107 becomes the ON state, the transformer 108 starts to accumulate energy. Accordingly, the amount of the current flowing into the transformer 108 increases, and the input voltage of the IS terminal 404 of the IC 503 increases correspondingly. The IS voltage input to the IS terminal 404 is subjected to A/D conversion by the AD converter 600b, and is output to the selector 606 and the IS voltage amplifier 605. The IS voltage amplifier 605 amplifies the input IS voltage by a predetermined amplification factor (gain), and outputs the amplified IS voltage to the selector 606. The selector 606 selects the non-amplified IS voltage or the amplified IS voltage in accordance with the selection signal (voltage amplification designation signal) from the pulse cycle calculator 604, and outputs the selected IS voltage to the FB voltage-IS' voltage comparator 607 as a corrected IS voltage (represented by IS' voltage in FIG. 7B). When the cycle of the pulse signal is included in a predetermined cycle range centered around a predetermined resonant cycle of the transformer 108, the pulse cycle calculator 604 outputs a selection signal of HIGH level. As a result, the selector 606 outputs the amplified IS voltage. Therefore, as described later, the turn-ON time of the FET 107 is shortened, and the switching frequency of the FET 107 becomes different from a frequency in a predetermined range centered around the resonant frequency of the transformer 108.

The FB voltage-IS' voltage comparator 607 monitors the corrected IS voltage (IS' voltage), which increases along with the energy accumulated in the transformer 108 when the FET 107 becomes the ON state, and the FB voltage. Then, when the FB voltage-IS' voltage comparator 607 detects that a voltage value of the corrected IS voltage has exceeded a voltage value of the FB voltage (timings P2, P5, P8, and P11 of FIG. 7B), the FB voltage-IS' voltage comparator 607 outputs a pulse signal (reset signal) to the R terminal of the FF 608. It is understood from FIG. 7B that the turn-ON time of the FET 107 is shorter when the amplified IS voltage is output from the selector 606 (timings P5 and P11) than when the non-amplified IS voltage is output (timings P2 and P8). In the FF 608, when the pulse signal output from the FB voltage-IS' voltage comparator 607 is input to the R terminal, the output of the Q terminal becomes LOW level. As a result, a predetermined voltage is not applied via the OUT terminal 406 to the gate terminal of the FET 107 to which the output of the Q terminal of the FF 608 is input. Thus, the FET 107 becomes the OFF state. When the FET 107 becomes the OFF state, the transformer 108 ends the accumulation of energy and starts the regeneration of energy.

As described above, according to this embodiment, the vibration noise generated from the transformer in the light load operation can be reduced, and power consumption can be reduced. Through the above-mentioned control, the DC power supply device in this embodiment performs the operation of shortening the conductive time in the switching of the FET at a frequency substantially matching with the resonant frequency of the transformer at which the vibration noise of the transformer is conspicuously generated. The current amount supplied to the secondary side of the transformer becomes insufficient due to the shortened conductive time, but the current amount is interpolated by shortening the switching interval of the FET. In this way, the stable supply of the DC voltage output on the secondary side of the transformer and the reduction in harsh vibration noise of the transformer can be realized at the same time.

In addition, in this embodiment, the filter circuit for the IS voltage is formed of a digital circuit, and hence the control of reducing vibration noise can be realized by more ideal filter characteristics (frequency band, amplification factor) as compared with the first embodiment in which the filter circuit is formed of an analog circuit. In this embodiment, the control and effect have been described on the premise of the configuration in which the filter characteristics are uniquely limited in the control IC. It is, however, not necessary to limit the filter characteristics to be unique. As in the second embodiment, a control unit (for example, CPU) and a memory may be provided in the load on the secondary side of the transformer, and the control IC may receive, from the control unit, characteristics information specific to the transformer which is stored in the memory in advance, so as to change the filter characteristics to be optimized for each transformer.

Further, in this embodiment, the end of regeneration of energy of the transformer is detected based on the inclination of the FB voltage. For example, similarly to the power supply IC in the first and second embodiments, a terminal for inputting a BOTTOM voltage may be provided to the control IC so that the end of regeneration of energy of the transformer is detected by comparing a voltage (BOTTOM voltage) induced in the auxiliary winding of the transformer with the reference voltage.

Fourth Embodiment

In this embodiment, description is given below of a DC power supply device in which the drive timing is controlled so that the driving cycle of the FET does not match with the resonant cycle of the transformer with the use of an IC formed of a digital circuit similarly to the third embodiment.

In the third embodiment, when the driving cycle of the FET falls within a predetermined cycle range centered around the resonant cycle of the transformer, the next driving cycle of the FET is shortened to reduce vibration noise of the transformer. This embodiment is different from the third embodiment in that the vibration noise of the transformer is reduced by controlling the driving cycle of the FET so as to avoid the switching operation of the FET at a frequency substantially matching with the resonant frequency of the transformer. The circuit configuration of the DC power supply device of this embodiment is the same as in the third embodiment of FIG. 6, and hence description thereof is omitted. The operation of the DC power supply device in the normal operation is also the same as in the conventional example, and hence description thereof is omitted.

[Outline of Power Supply IC]

Figure 8A:
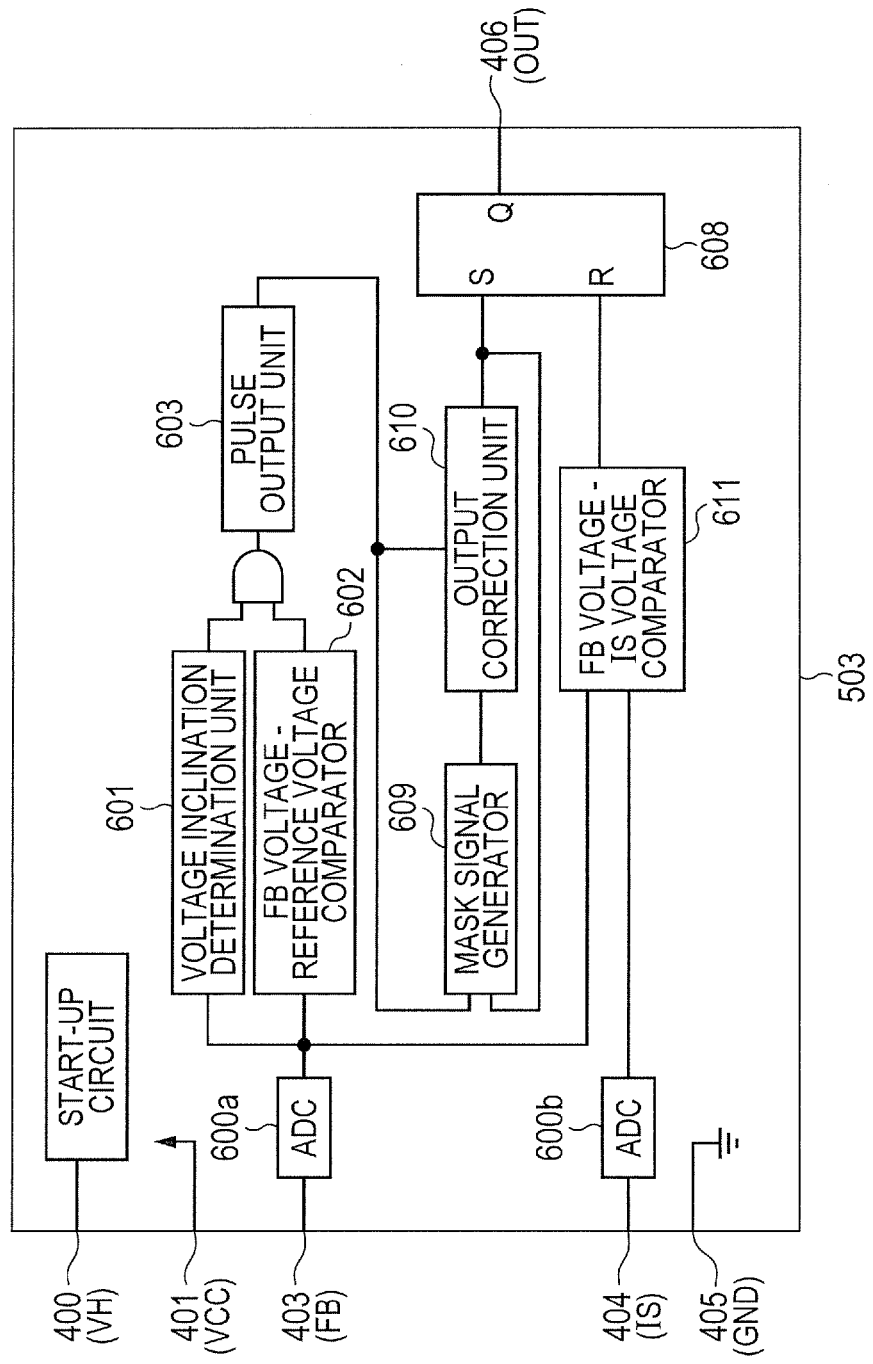
FIG. 8A illustrates a functional block diagram of a control IC according to the fourth embodiment of the present invention.

FIG. 8A is a functional block diagram illustrating an internal configuration of the IC 503 for controlling the FET 107 used in this embodiment. The IC 503 in this embodiment is partially different in circuit configuration from the IC 503 described in the third embodiment. In FIG. 8A, the same circuit configurations as in the third embodiment are denoted by the same reference symbols to omit description, and a different circuit configuration is described below.

In FIG. 8A, a mask signal generation unit 609 includes a counter for calculating the driving frequency of the FET 107, and an output section for outputting a mask signal to an output correction unit 610 in accordance with a counter value of the counter. The counter of the mask signal generation unit 609 is initialized in response to a pulse signal output from the pulse output unit 603 or a set (Set) signal output from the output correction unit 610. In response to the mask signal output from the mask signal generation unit 609, the output correction unit 610 delays the pulse signal input from the pulse output unit 603 by a predetermined time, and then outputs the resultant signal to the S terminal of the FF 608. An FB voltage-IS voltage comparator 611 compares the input voltage of the FB terminal 403 subjected to A/D conversion by the AD converter 600a and the input voltage of the IS terminal 404 subjected to A/D conversion by the AD converter 600b. Then, when a voltage value of the IS voltage is higher than a voltage value of the FB voltage, the FB voltage-IS voltage comparator 611 outputs a HIGH level signal to the R terminal of the FF 608.

[Outline of Operation of DC Power Supply Device]

Next, the internal operation of the IC 503 according to this embodiment in the case of the power-saving operation and in the case where the switching frequency of the FET 107 substantially matches with the resonant frequency of the transformer is described with reference to a timing chart of FIG. 8B.

Figure 8B:
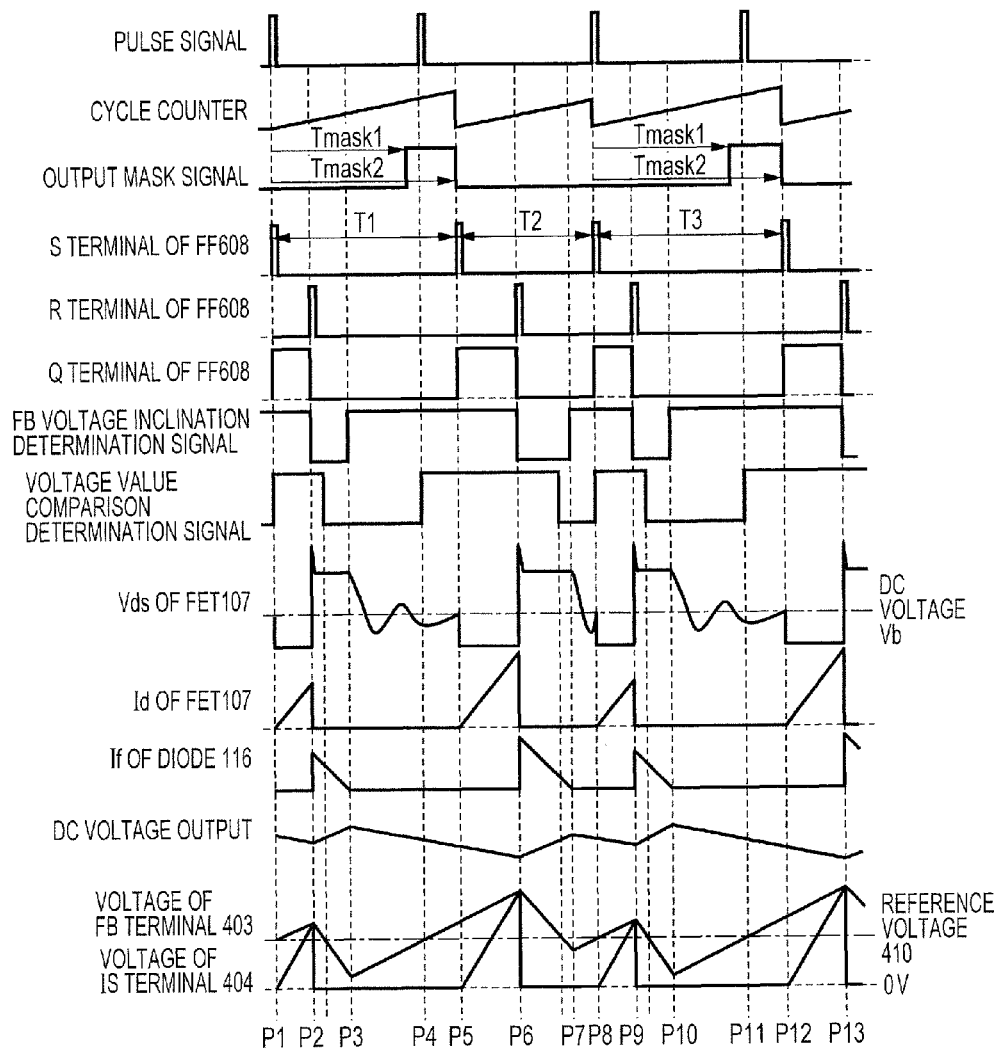
FIG. 8B illustrates a timing chart in a light load operation of the DC power supply device.

Operation waveforms illustrated in the timing chart of FIG. 8B are the same as those in the timing chart in the third embodiment except for those of "pulse signal", "cycle counter", and "output mask signal", and hence description thereof is omitted. The "pulse signal" represents an output pulse of the pulse output unit 603. A HIGH level pulse is output when an "FB voltage inclination determination signal" as the output of the voltage inclination determination unit 601 and a "voltage value comparison determination signal" as the output of the FB voltage-reference voltage comparator 602 are both HIGH level. The "cycle counter" represents a counter value of the counter provided in the mask signal generation unit 609 for calculating the driving frequency of the FET 107. The "output mask signal" is a signal output from the mask signal generation unit 609 to the output correction unit 610, and HIGH level is output when the driving frequency of the FET 107 calculated by the "cycle counter" is a frequency within a predetermined range.

For example, consider the case where the FET 107 is prevented from being driven in a frequency band of (f0−fb) to (f0+fb), where f0 represents the resonant frequency of the transformer 108, in order to reduce vibration noise generated from the transformer in the light load operation. The "cycle counter" measures the cycle of driving the FET 107. When the counter value becomes larger than a cycle corresponding to the frequency (f0+fb) (interval Tmask1 of FIG. 8B), the "output mask signal" becomes HIGH level. Then, when the counter value of the "cycle counter" becomes larger than a cycle corresponding to the frequency (f0−fb) (interval Tmask2 of FIG. 8B), the "output mask signal" changes from HIGH level to LOW level. The output correction unit 610 does not output the set signal to the S terminal of the FF 608 if the "output mask signal" is HIGH level when the pulse signal is output from the pulse output unit 603, and outputs the set signal to the S terminal of the FF 608 when the "output mask signal" becomes LOW level.

(1) Determination of Conductive (ON) State of FET 107

The voltage inclination determination unit 601 outputs HIGH level when detecting that the regeneration of energy by the transformer 108 has ended and the input voltage of the FB terminal 403 of the IC 503 has a positive inclination (intervals between P3 to P6, P7 to P9, and P10 to P13 of FIG. 8B). The FB voltage-reference voltage comparator 602 outputs HIGH level when detecting that the input voltage of the FB terminal 403 has exceeded the reference voltage 410 (timings P1, P4, P8, and P11). When the HIGH level signals are simultaneously output from the voltage inclination determination unit 601 and the FB voltage-reference voltage comparator 602, the pulse output unit 603 outputs a pulse signal of HIGH level.

The mask signal generation unit 609 has the internal counter, and outputs the output mask signal in accordance with the value of the counter. HIGH level of the output mask signal is output in the period from the preset counter value Tmask1 to the preset counter value Tmask2. The period from the counter value Tmask1 to the counter value Tmask2 is a predetermined period including the resonant cycle of the transformer 108. When the output mask signal is LOW level, the counter of the mask signal generation unit 609 is initialized in response to the pulse signal output from the pulse output unit 603 (timings P1 and P8). When the output mask signal is HIGH level, on the other hand, the counter of the mask signal generation unit 609 is initialized in response to the set signal output from the output correction unit 610 (timings P5 and P12).

The output correction unit 610 controls whether the pulse signal output from the pulse output unit 603 is directly output to the S terminal of the FF 608 or output thereto after a delay of a predetermined time. In the case where the output correction unit 610 receives the pulse signal from the pulse output unit 603 when the output mask signal is LOW level, the output correction unit 610 outputs the pulse signal directly to the S terminal of the FF 608 (timings P1 and P8 of FIG. 8B). On the other hand, in the case where the output correction unit 610 receives the pulse signal from the pulse output unit 603 when the output mask signal is HIGH level (timing P4), the output correction unit 610 does not output the pulse signal directly but outputs the pulse signal to the S terminal of the FF 608 after the output mask signal becomes LOW level (timing P5).

In the FF 608, when the pulse signal (set signal) output from the output correction unit 610 is input to the S terminal, the output of the Q terminal becomes HIGH level, and the output voltage of the Q terminal is applied to the gate terminal of the FET 107 via the OUT terminal 406 so that the FET 107 becomes the ON state.

(2) Determination of Non-Conductive (OFF) State of FET 107

When the FET 107 becomes the ON state, the transformer 108 starts to accumulate energy. Accordingly, the amount of the current flowing into the transformer 108 increases, and the input voltage of the IS terminal 404 of the IC 503 increases correspondingly. The IS voltage input to the IS terminal 404 is subjected to A/D conversion by the AD converter 600b, and is output to the FB voltage-IS voltage comparator 611. Similarly, the FB voltage input to the FB terminal 403 is also subjected to A/D conversion by the AD converter 600a, and is output to the FB voltage-IS voltage comparator 611.

The FB voltage-IS voltage comparator 611 monitors the IS voltage, which increases along with the energy accumulated in the transformer 108 when the FET 107 becomes the ON state, and the FB voltage. Then, when the FB voltage-IS voltage comparator 611 detects that a voltage value of the IS voltage has exceeded a voltage value of the FB voltage (timings P2, P6, P9, and P13 of FIG. 8B), the FB voltage-IS voltage comparator 611 outputs a pulse signal (reset signal) to the R terminal of the FF 608. In the FF 608, when the pulse signal output from the FB voltage-IS voltage comparator 611 is input to the R terminal, the output of the Q terminal becomes LOW level. As a result, a predetermined voltage is not applied via the OUT terminal 406 to the gate terminal of the FET 107 to which the output of the Q terminal of the FF 608 is input. Thus, the FET 107 becomes the OFF state. When the FET 107 becomes the OFF state, the transformer 108 ends the accumulation of energy and starts the regeneration of energy.

As described above, in this embodiment, the vibration noise generated from the transformer in the light load operation can be reduced, and power consumption can be reduced. Through the above-mentioned control, the DC power supply device in this embodiment delays the switching cycle of the FET to avoid the operation of the FET 107 at a frequency substantially matching with the resonant frequency of the transformer at which the vibration noise of the transformer is conspicuously generated. Thus, the reduction in harsh vibration noise of the transformer can be realized.

In addition, in this embodiment, the control of delaying the switching frequency of the FET is performed by a digital circuit, and hence there is an advantage that the delay time can be corrected more accurately as compared with the second embodiment in which the delay control is performed by an analog circuit. In this embodiment, the control and effect have been described on the premise of the configuration in which the delay time and the mask start time are uniquely limited in the control IC. It is, however, not necessary to limit the delay time and the mask start time to be unique. For example, as in the second embodiment, a control unit (for example, CPU) and a memory may be provided in the load on the secondary side of the transformer, and the control IC may receive from the control unit characteristics information specific to the transformer which is stored in the memory in advance, so as to change filter characteristics (the delay time and the mask start time) to be optimized for each transformer.

Fifth Embodiment

The power supply device described in the first to fourth embodiments is applicable as, for example, a low voltage power supply of an image forming apparatus, that is, a power supply for supplying electric power to a controller or a driving unit such as a motor. Description is now given of a configuration of the image forming apparatus to which the power supply device according to the first to fourth embodiments is applied.

[Configuration of Image Forming Apparatus]

Figure 9:
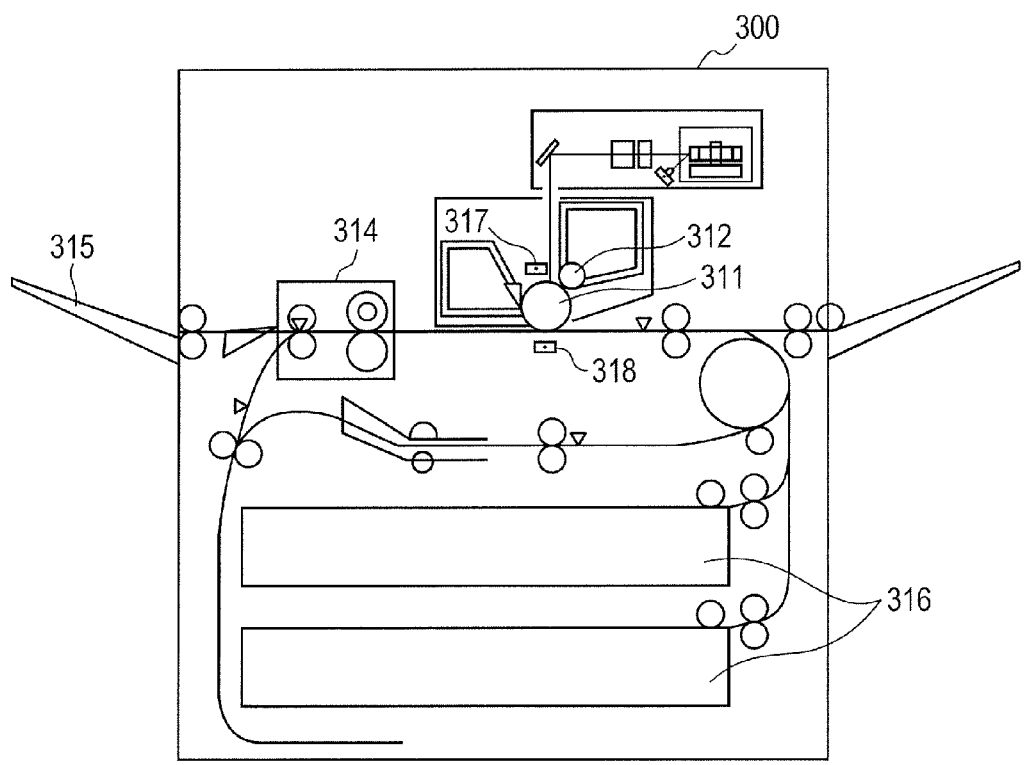
FIG. 9 illustrates a schematic configuration of a laser beam printer according to a fifth embodiment of the present invention.

A laser beam printer is described as an example of the image forming apparatus. FIG. 9 illustrates a schematic configuration of the laser beam printer as an example of an electrophotographic printer. A laser beam printer 300 includes a photosensitive drum 311 as an image bearing member on which an electrostatic latent image is to be formed, a charging unit 317 (charging means) for uniformly charging the photosensitive drum 311, and a developing unit 312 (developing means) for developing the electrostatic latent image formed on the photosensitive drum 311 with toner. A toner image developed on the photosensitive drum 311 is transferred by a transfer unit 318 (transfer means) onto a sheet (not shown) as a recording material supplied from a cassette 316. The toner image transferred onto the sheet is fixed by a fixing unit 314 and is discharged to a tray 315. The photosensitive drum 311, the charging unit 317, the developing unit 312, and the transfer unit 318 correspond to an image forming unit. The laser beam printer 300 further includes the power supply device (not shown in FIG. 9) described in the first to fourth embodiments. The image forming apparatus to which the power supply device in the first to fourth embodiments is applicable is not limited to the one exemplified in FIG. 9. For example, the image forming apparatus may include multiple image forming units. Alternatively, the image forming apparatus may include a primary transfer unit for transferring the toner image formed on the photosensitive drum 311 onto an intermediate transfer belt, and a secondary transfer unit for transferring the toner image formed on the intermediate transfer belt onto a sheet.

The laser beam printer 300 includes a controller (not shown) for controlling an image forming operation of the image forming unit and a sheet conveyance operation. The power supply device described in the first to fourth embodiments supplies electric power to, for example, the controller. The power supply device in the first to fourth embodiments supplies electric power also to a driving unit such as a motor for rotating the photosensitive drum 311 or driving various kinds of rollers for conveying a sheet. In other words, the load 119 in the first to fourth embodiments corresponds to the controller or the driving unit. The image forming apparatus in this embodiment can reduce power consumption by reducing the load, such as by supplying electric power only to the controller, in the case where the image forming apparatus is in a standby state for realizing power saving (for example, power-saving mode or standby mode). In other words, in the image forming apparatus in this embodiment, in the power-saving mode, the power supply device described in the first to fourth embodiments performs the intermittent oscillation operation in the light load state. When the image forming apparatus operates in the power-saving mode, vibration noise generated from the transformer 108 of the power supply device can be reduced and power consumption can be reduced by the configuration described in the first to fourth embodiments.

As described above, according to this embodiment, in the switching power supply of the image forming apparatus, the vibration noise generated from the transformer in the light load operation can be reduced, and power consumption can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053524, filed Mar. 9, 2012, which is hereby incorporated by reference herein in its entirety.

What is claimed is:

1. A power supply device, comprising:
   a transformer in which a primary side and a secondary side are insulated with each other;
   a switching unit configured to switch the primary side of the transformer;
   a detection unit configured to detect a current flowing on the primary side to output a first signal corresponding to the detected current;
   a transmission unit configured to transmit a second signal corresponding to an output voltage from the secondary side to the primary side; and
   a control unit configured to control an operation of the switching unit in accordance with the second signal from the transmission unit and the first signal output from the detection unit; and
   a correction unit configured to correct the first signal output from the detection unit according to a resonance frequency,
   wherein, when a switching frequency of the switching unit is reduced, the control unit controls a turn-on time of the switching unit based on the second signal from the transmission unit and the first signal corrected by the correction unit.

2. A power supply device according to claim 1, wherein, when the first signal corrected by the correction unit exceeds an output voltage of the transmission unit, the control unit turns on the switching unit.

3. A power supply device according to claim 2,
   wherein the detection unit converts a current value flowing on the primary side to output a voltage,
   wherein the correction unit comprises:
   a first resistor and a second resistor which are connected in series to divide the voltage output by the detection unit; and
   a circuit including a coil and a capacitor which are connected in series, the circuit being connected at both ends of the first resistor in parallel, and
   wherein the correction circuit is set so that an oscillation frequency of the circuit including the coil and the capacitor is to be the resonant frequency of the transformer.

4. A power supply device according to claim 1,
   wherein the output first signal by the detection unit is a voltage converted from a current on the primary side, and
   wherein the control unit revises a voltage of the detection unit by amplifying the output voltage output by the detection unit with a predetermined amplification factor to shorten a time period until a value indicating the first signal output by the detection unit reaches a value higher than a value indicating the second signal of the transmission unit.

5. A power supply device, comprising:
a transformer in which a primary side and a secondary side are insulated with each other;
a switching unit configured to switch the primary side of the transformer;
a detection unit configured to detect a current flowing on the primary side to output a first signal corresponding to the detected current;
a transmission unit configured to transmit a second signal corresponding to an output voltage from the secondary side to the primary side;
a control unit configured to control an operation of the switching unit in accordance with the second signal from the transmission unit; and
a voltage reduction unit provided on the secondary side, the voltage reduction unit configured to reduce the second signal transmitted by the transmission unit,
wherein, when a switching frequency of the switching unit is reduced, the control unit controls a timing when the switching unit is turned on by reducing the second signal transmitted by the transmission unit, by the voltage reduction unit.

6. A power supply device according to claim 5, further comprising a smoothing and rectifying unit for smoothing and rectifying an output voltage on the secondary side to output a smoothed and rectified voltage to the transmission unit,
wherein the voltage reduction unit corrects the output voltage smoothed and rectified by the smoothing and rectifying unit to be output to the transmission unit.

7. A power supply device according to claim 6,
wherein the transmission unit includes an error detection unit for comparing the smoothed and rectified voltage output by the smoothing and rectifying unit, with a reference voltage,
wherein the error detection unit includes a shunt regulator to which a voltage is input at a node between a first resistor and a second resistor connected in series to divide the output voltage of the smoothing and rectifying unit,
wherein the shunt regulator includes a reference terminal for inputting a voltage at a node between a first resistor and a second resistor connected in series, the first resistor and the second resistor dividing the output voltage of the smoothing and rectifying unit, and
wherein the voltage reduction unit includes a third resistor and a switch connected in series connected at both ends of the first resistor, so that a voltage input to the reference terminal is increased by turning on the switch.

8. A power supply device according to claim 5,
wherein in a case where a time until it is detected that a value indicating the second signal transmitted by the transmission unit to the control unit exceeds a predetermined voltage is a cycle corresponding to a predetermined frequency range centered around a resonant frequency of the transformer, the control unit delays a timing of turning on the switching unit by a predetermined time.

9. An image forming apparatus, comprising:
an image forming unit for forming an image on a recording material;
a driving unit for driving the image forming unit; and
a power supply for supplying electric power to the driving unit,
wherein the power supply comprises:
a transformer in which a primary side and a secondary side are insulated with each other;
a switching unit configured to switch the primary side of the transformer;
a detection unit configured to detect a current flowing on the primary side to output a first signal corresponding to the detected current;
a transmission unit configured to transmit a second signal corresponding to an output voltage from the secondary side to the primary side;
a control unit configured to control an operation of the switching unit in accordance with the second signal from the transmission unit and the first signal from the detection unit; and
a correction unit configured to correct the first signal output from the detection unit according to a resonance frequency,
wherein, when a switching frequency of the switching unit is reduced, the control unit controls a turn-on time of the switching unit based on the output voltage from the transmission unit and the first signal corrected by the correction unit.

10. An image forming apparatus, comprising:
an image forming unit for forming an image on a recording material;
a controller for controlling an operation of the image forming unit; and
a power supply for supplying electric power to the controller,
wherein the power supply comprises:
a transformer in which a primary side and a secondary side are insulated with each other;
a switching unit configured to switch the primary side of the transformer;
a detection unit configured to detect a current flowing on the primary side to output a first signal corresponding to the detected current;
a transmission unit configured to transmit a second signal corresponding to an output voltage from the secondary side to the primary side;
a control unit configured to control an operation of the switching unit in accordance with the second signal from the transmission unit and the first signal output from the detection unit; and
a correction unit for correcting the first signal output from the detection unit according to a resonance frequency,
wherein, when a switching frequency of the switching unit is reduced, the control unit controls a turn-on time of the switching unit based on the output voltage from the transmission unit and the first signal corrected by the correction unit.

11. An image forming apparatus, comprising:
an image forming unit for forming an image on a recording material;
a driving unit for driving the image forming unit; and
a power supply for supplying electric power to the driving unit,
wherein the power supply comprises:
a transformer in which a primary side and a secondary side are insulated with each other;
a switching unit configured to switch the primary side of the transformer;
a detection unit configured to detect a current flowing on the primary side to output a first signal corresponding to the detected current;

a transmission unit configured to transmit a second signal corresponding to an output voltage from the secondary side to the primary side;

a control unit configured to control an operation of the switching unit in accordance with the second signal from the transmission unit; and a voltage reduction unit provided on the secondary side, the voltage reduction unit configured to reduce the second signal transmitted by the transmission unit, wherein, when a switching frequency of the switching unit, is reduced, the control unit controls a timing when the switching unit is turned on, by reducing the second signal transmitted by the transmission unit, by the voltage reduction unit.

12. An image forming apparatus, comprising:

an image forming unit for forming an image on a recording material;

a controller for controlling an operation of the image forming unit; and a power supply for supplying electric power to the controller, wherein the power supply comprises:

a transformer in which a primary side and a secondary side are insulated with each other;

a switching unit configured to switch the primary side of the transformer;

a detection unit configured to detect a current flowing on the primary side to output a first signal corresponding to the detected current;

a transmission unit configured to transmit a second signal correspond to an output voltage from the secondary side to the primary side;

a control unit configured to control an operation of the switching unit in accordance with the second signal from the transmission unit; and a voltage reduction unit provided on the secondary side, the voltage reduction unit configured to reduce the second signal transmitted by the transmission unit, wherein, when a switching frequency of the switching unit, is reduced, the control unit controls a timing when the switching unit is turned on, by reducing the second signal transmitted by the transmission unit, by the voltage reduction unit.

13. The image forming apparatus according claim 9, wherein a condition in which the switching frequency of the switching unit is reduced includes the power-saving mode of the image forming apparatus.

14. The image forming apparatus according claim 10, wherein a condition in which the switching frequency of the switching unit is reduced includes a power-saving mode of the image forming apparatus.

15. The image forming apparatus according claim 11, wherein a condition in which the switching frequency of the switching unit is reduced includes a power-saving mode of the image forming apparatus.

16. The image forming apparatus according claim 12, wherein a condition in which the switching frequency of the switching unit is reduced includes a power-saving mode of the image forming apparatus.

\* \* \* \* \*